(12) United States Patent
Montalto et al.

(10) Patent No.: US 11,930,049 B2
(45) Date of Patent: Mar. 12, 2024

(54) DATA COMMUNICATION SYSTEM AND METHOD

(71) Applicant: KWINGLE INC., Trumbull, CT (US)

(72) Inventors: James J. Montalto, Brookfield, CT (US); Lisa Cerbone-Montalto, Brookfield, CT (US); Brian Meehan, Fairfield, CT (US); Rohit Singal, Bangalore (IN)

(73) Assignee: KWINGLE INC., Trumbull, CT (US)

( * ) Notice: Subject to any disclaimer, the term of this patent is extended or adjusted under 35 U.S.C. 154(b) by 247 days.

(21) Appl. No.: 17/307,752

(22) Filed: May 4, 2021

(65) Prior Publication Data

US 2021/0258355 A1   Aug. 19, 2021

Related U.S. Application Data

(63) Continuation of application No. 13/575,208, filed as application No. PCT/US2011/022415 on Jan. 25, 2011, now Pat. No. 11,601,477.

(60) Provisional application No. 61/373,242, filed on Aug. 12, 2010, provisional application No. 61/316,823, filed on Mar. 23, 2010, provisional application No. 61/297,967, filed on Jan. 25, 2010.

(51) Int. Cl.
| | |
|---|---|
| *H04L 65/1063* | (2022.01) |
| *H04L 65/1059* | (2022.01) |
| *H04L 65/1069* | (2022.01) |
| *H04L 65/61* | (2022.01) |
| *H04N 7/14* | (2006.01) |

(52) U.S. Cl.
CPC ...... *H04L 65/1063* (2013.01); *H04L 65/1059* (2013.01); *H04L 65/1069* (2013.01); *H04L 65/61* (2022.05); *H04N 7/147* (2013.01)

(58) Field of Classification Search
CPC . H04L 65/1063; H04L 65/61; H04L 65/1059; H04L 65/1069; H04N 7/147
See application file for complete search history.

(56) References Cited

U.S. PATENT DOCUMENTS

| | | |
|---|---|---|
| 8,396,074 B1 | 3/2013 | McNamara et al. |
| 9,143,818 B1 | 9/2015 | Barraclough et al. |
| 2003/0179317 A1 | 9/2003 | Sigworth |
| 2006/0085823 A1* | 4/2006 | Bell ............... H04N 21/25833 348/E7.071 |
| 2006/0215753 A1 | 9/2006 | Lee et al. |

(Continued)

OTHER PUBLICATIONS

U.S. Appl. No. 13/575,208, filed Aug. 1, 2017, Response to Non-Final Action filed Jun. 21, 2021.

*Primary Examiner* — Jefferey F Harold
*Assistant Examiner* — Franklin S Andramuno
(74) *Attorney, Agent, or Firm* — Amster, Rothstein & Ebenstein LLP

(57) ABSTRACT

A first mobile communication device is configured to transmit video and audio content to a second mobile communication device utilizing a server. The first mobile communication device, via the server, transmits a share request or "knock" with the second mobile communication device. The second device must either accept the request or reject the request. If the second mobile communication device accepts the knock, it transmits a share accept message to the server. The first mobile communication device then transmits the video and audio content to the second mobile communication device via the server.

10 Claims, 20 Drawing Sheets

(56) References Cited

U.S. PATENT DOCUMENTS

| | | |
|---|---|---|
| 2007/0016753 A1 | 1/2007 | Winter |
| 2007/0153827 A1 | 7/2007 | Lee |
| 2008/0051071 A1* | 2/2008 | Vishwanathan .. H04M 3/42051 |
| | | 455/414.1 |
| 2008/0117928 A1* | 5/2008 | Abhyanker ............. H04L 67/14 |
| | | 709/227 |
| 2009/0232129 A1 | 9/2009 | Wong et al. |
| 2009/0307715 A1 | 12/2009 | Santamaria et al. |
| 2011/0004665 A1 | 1/2011 | Kim |
| 2011/0029598 A1 | 2/2011 | Arnold et al. |
| 2011/0055935 A1* | 3/2011 | Karaoguz ............... G06F 21/10 |
| | | 709/204 |
| 2011/0086611 A1* | 4/2011 | Klein .................... H04M 15/00 |
| | | 455/407 |
| 2012/0010995 A1 | 1/2012 | Skirpa et al. |
| 2012/0233644 A1 | 9/2012 | Rao |

\* cited by examiner

DATA COMMUNICATION SYSTEM AND METHOD

CROSS-REFERENCE TO RELATED APPLICATIONS

The present application is a continuation of U.S. patent application Ser. No. 13/575,208 filed Aug. 1, 2017, which claims the benefit of priority to PCT International Application No. PCT/US11/22415, filed 25 Jan. 2011, which claims the benefit of and priority to U.S. Provisional Application Ser. No. 61/297,967 filed 25 Jan. 2010; U.S. Provisional Application Ser. No. 61/316,823 filed 23 Mar. 2010; and U.S. Provisional Application Ser. No. 61/373,242 filed 12 Aug. 2010; each of which is incorporated herein by reference in its entirety.

TECHNICAL FIELD OF THE INVENTION

The present disclosure relates to systems and methods for communicating data. More particularly, the present disclosure relates to systems and methods of communicating data over a wireless communication network.

BACKGROUND OF THE INVENTION

Wireless or mobile communication devices, including mobile phones and smart phones, have become increasingly popular. Such communication devices are compact in size and provide powerful features and functions. For example, most mobile communication devices are equipped with a digital camera allowing users to easily take photo images without needing to carry a separate camera.

Currently, camera-enabled mobile communication devices, along with the use of wireless mobile data networks, allow users of such devices to easily store, access, maintain and share their digital pictures wirelessly with other mobile communication device users. However, due to the limitations in the bandwidth of current wireless mobile data networks and the limited processing power of existing mobile communication devices, users of current mobile communication devices are not able to quickly and efficiently transmit photo and video images wirelessly across mobile data networks.

Thus, to facilitate the sharing of multimedia content, such as photos and video content & voice, over a wireless mobile data network, including a mobile phone network, there is a need for a system and method to efficiently identify whether data can be transferred between two or more mobile communication devices. In addition, there is a need for a system and method to allow users to share photos and videos over a wireless mobile data network. Furthermore, there is a need for a system and method to allow users to share multimedia data, such as images and videos, over a wireless mobile data network using a relay server connection to transmit data. In addition, there is a need for a system and method to allow users to share data between their mobile communication devices using any suitable wireless network including, but not limited to, mobile data networks like WiFi, Bluetooth, and the like. This system needs to be designed in such a way that it supports user to share the photo and video while the device is connected to internet via WiFi or any other wireless network including the mobile data networks.

SUMMARY OF THE INVENTION

The problems described above are solved by the systems and methods of the illustrative embodiments described herein. One embodiment provides a system and method for transmitting video content. A first mobile communication device including a camera and a display. A second mobile communication device having a display. At least one server is coupled to the first mobile communication device and the second mobile communication device through a network. The first mobile communication device is configured to transmit the video content to the second mobile communication device utilizing the server. The first mobile communication device is configured to transmit a share request to the second mobile communication device. The second mobile communication device is configured to at least one of transmit a share accept, a share reject message and not respond to the share request message. In response to receiving a share accept from the second mobile communication device, the first mobile communication device is configured to transmit to the second mobile communication device the video content. In response to either of the share reject message or no response to the share request message, the first mobile communication device is configured to not transmit the video content to the second mobile communication device.

Another embodiment provides a method for transmission of video content between a first mobile communication device and a second mobile communication device. A share request message is transmitted first mobile communication device to the second mobile communication device utilizing an Apple Push Notification Service (APNS) notification or through a relay server. At least one of a share accept message and a share reject message or not receiving any response to the share request message are received from the second mobile communication device. The video content is transmitted to the second mobile communication device in response to receiving a share accept from the second mobile communication device. No transmission is performed in response to receiving either of the share reject message and no response to the share request message.

Yet another embodiment provides a computer program product used with a processor. A computer readable medium, including computer readable program code embodied therein, used when implementing a method for controlling the transmission of video content between a first wireless device and a second wireless device. The computer readable medium including computer readable program code that provides for transmitting a share request message from the first wireless device to the second wireless device. The code further provides for receiving from the second wireless device at least one of a share accept message and a share reject message or not receiving any response to the share request message. The code further provides for transmitting to the second wireless device the video content indirectly via one or more servers, in response to a share accept from the second wireless device. The code further provides for not transmitting the video content in response to either of the share reject message or no response to the share request message.

Yet another embodiment provides a system for transmitting video content. The system includes a first mobile communication device having a camera and a display. The system further includes a second mobile communication device having a display. The system further includes at least one server coupled to the first mobile communication device and the second mobile communication device through a network. The first mobile communication device is configured to transmit the video content to the second mobile communication device utilizing the server. The first mobile communication device is configured to transmit a share request to the second mobile communication device. The second mobile communication device is configured to at least one of transmit a share accept, a share reject message and not respond to the share request message. In response to receiving a share accept from the second mobile communication device, the first mobile communication device is configured to transmit to the second mobile communication device the video content including video image content and audio content. The video image content and the audio content are sent through separate channels. In response to receiving either of the share reject message or no response to the share request message, the first mobile communication device is configured to not transmit the video content to the second mobile communication device.

Yet another embodiment provides a method for transmission of video content between a first mobile communication device and a second mobile communication device. A share request message is transmitted from the first mobile communication device to the second mobile communication device utilizing an APNS notification or through a relay server. The second mobile communication device receives at least one of a share accept message and a share reject message or not receiving any response to the share request message. The video content including video image content and audio content is transmitted to the second mobile communication device in response to receiving a share accept from the second mobile communication device. The video image content and the audio content are communicated separately. The video content is not transmitted in response to receiving either of the share reject message or no response to the share request message.

BRIEF DESCRIPTION OF THE DRAWINGS

Illustrative embodiments of the present disclosure are described in detail below with reference to the attached drawing figures, which are incorporated by reference herein and wherein:

FIG. 24c is a pictorial representation of a profile of a user of the Knocking® mobile application on the user's device in accordance with an illustrative embodiment; and FIG. 24d is a pictorial representation of a Knocking user's profile on the user's device showing additional profile information in accordance with an illustrative embodiment.

DETAILED DESCRIPTION OF THE INVENTION

The illustrative embodiments provide a system and method for sharing live or recorded video content. Video content is herein defined to include audio and video content that may be sent through a single stream, separate channels, asynchronously, synchronously, or in any number of formats. In various embodiments, only video or only audio content may be sent based on available resources, to preserve bandwidth, in response to a user selection, or based on other automatic or manual determinations. In one embodiment, the sharing is performed conditionally contingent upon the receiving party accepting the invitation or "knock" in order to preserve bandwidth, processing power, memory, and other resources. In other embodiment, settings or user preferences in the utilized wireless or electronic device may control automatic acceptance of a "knock." Logic, user preferences, settings, or user input may control performance and operation of the video session.

It should be understood that such content may contain information related to a wide variety of topics including for example, information related to financial news, business news, political news, political campaigns, emergency situations, advertising, religion, sports teams, celebrity news, entertainment news; personal profiles, family gatherings, or celebrity profiles. As will be appreciated by those skilled in the art, the disclosed embodiments might be used to convey information to a single viewer or a select group of viewers who subscribe to a daily stock tip service, or who wish to view a news update. They may be used to convey information to a group of first responders during emergency situations, or to religious groups who wish to receive message from a religious leader. Likewise, those wishing to receive content from celebrities or other entertainers may utilize such a content delivery system. It may be used by schools to disseminated information to student's parents, by teachers and universities to communicate with classes and students. Further, it may be used by companies to broadcast meetings or information to employees or stock holders, it may be used by service organizations, sales force, personal coaches, or any one interested in conveying content to a single person or a group of viewers. As will be appreciated by those skilled in the art the uses disclosed herein are intended to limit the scope of the invention but are given as illustrative examples.

Figure 1:
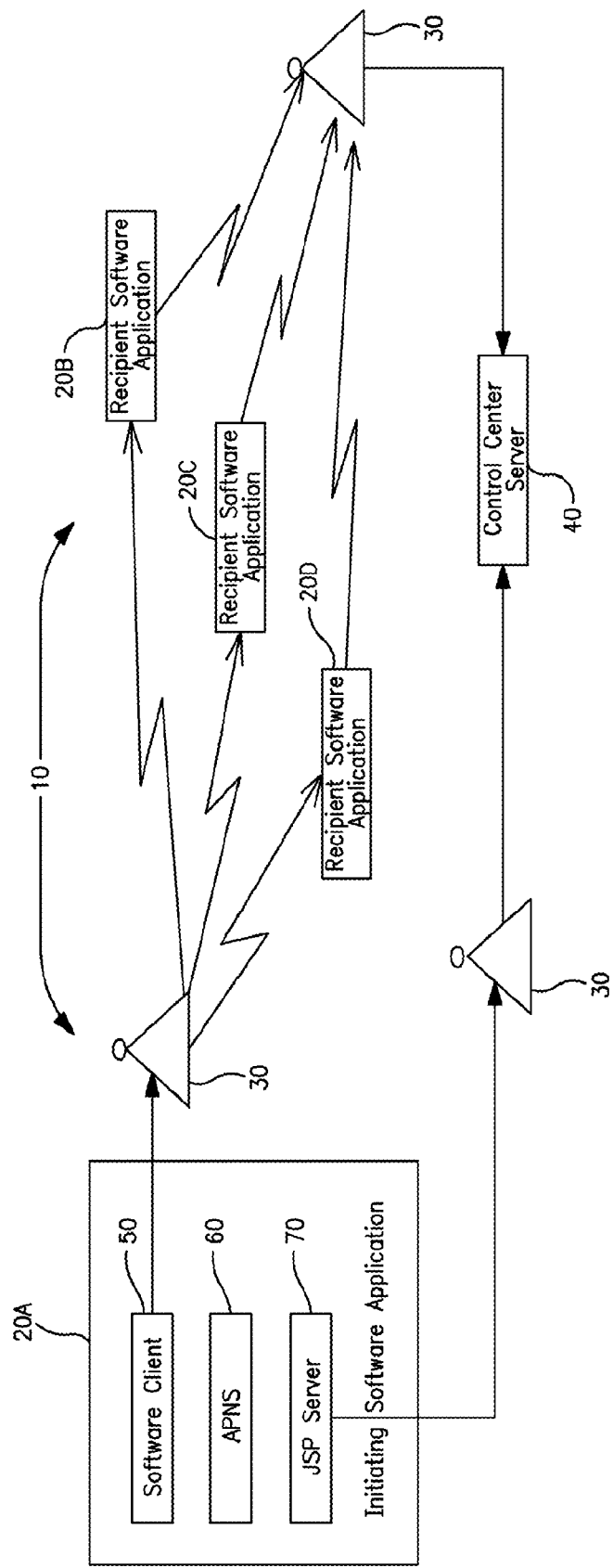
FIG. 1 is a block diagram showing the components utilized by a data communication system and method in accordance with an illustrative embodiment.

A system for wireless data communication is generally referred to by numeral 10, as shown in FIG. 1 of the drawings. The system 10 includes an initiating software application 20A that is configured to communicate via a wireless mobile data network 30, such as a wireless mobile phone data network with one or more recipient software applications 20B-D and a control center server 40. It should be appreciated that the control center server 40 may comprise any computing system suitable for carrying out the functions of the system 10 to be discussed. The system 10 is configured such that the initiating software application 20A is able to selectively establish a wireless communication session with one or more recipient software applications 20B-D in accordance with a process to be discussed via a connection passing through the remote control center server 40. It should be appreciated that the software applications 20A-D comprises software that is configured for execution on a mobile communication device, such as a smart phone, handheld computer, portable computer, or any other mobile communication device.

Specifically, because the initiating client application 20A, as well as the recipient client applications 20B-D, are structurally equivalent, only the components provided by the initiating client application 20A will be presented. In particular, the initiating client application 20A includes a software client component 50, an APNS component 60, and a Java Server Pages (JSP) component 70. System 10 requires a means for notifying the recipient applications 20B-D even though they are not currently active. As such, whenever the initiating application 20A wants to notify any other recipient application 20B-D, it will contact the JSP server component 70 with suitable messages. In response to these messages, the JSP component 70 requests the APNS server component 60 to send a notification to the target recipient application 20B-D. Specifically, the JSP component 70 maintains a database of device tokens for each registered initiation and recipient application 20A-D. This device token is generated by the APNS component 60. Whenever the client application 20A wants to send a recipient application 20B-D, a share data request, he will contact the JSP server component 70 with a user identification code. The JSP server component 70 fetches the relevant device token from its database and requests the APNS component 60 for notification. Thus, each registered application is notified on time even though it is not active.

Continuing, the client component 50 of the initiating application 20A wirelessly communicates share request messages with the recipient applications 20B-D via the wireless mobile data network 30. Specifically, the initiating application 20A establishes a TCP (Transmission Control Protocol) connection and a UDP (User Datagram Protocol) connection to the IP (Internet Protocol) address and port number respectively that is associated with one of the recipient software applications 20B-D supplied by the JSP server 40 of the initiating application 20A. Once the initiating application 20 is connected to a particular recipient software application 20B-D, the initiating application 20A sends a registration message to the control center server 40 to enable the initiating application 20A to communicate messages to the recipient applications 20B-D.

In response to the receipt of a share request message, the recipient application 20B-D communicates request acceptance messages, comprising either a share accept or share reject status, back to the control center server 40 via the mobile phone network 30. Once received, the control center server 40 sends the acceptance status to both the initiating application 20A and the recipient applications 20B-D. If shares accept message is sent from the recipient applications 20B-D, then a new communication session will be created with the desired recipient applications 20B-D and the initiating software application 20A. Once established, the session determines the specific communication protocol, based on the network conditions, which is to be utilized to establish communication between the initiating application 20A and one or more of the recipient applications 20B-D. However, if a share reject message is sent from the recipient application 20B-D, then the session is ended, and communication between the applications 20A and 20B-D is terminated.

The illustrative embodiments may be implemented entirely in hardware, software, firmware, or in a combination thereof. In one embodiment, an application may store instructions, code, or programming to implement the described methods, communications, and features. In another embodiment, digital logic or programmable logic may be utilized to implement the methods, communications, and features herein described. Any of the computing and communications devices described in FIG. 1 may include a processor and memory.

The processor is circuitry or logic enabled to control execution of a set of instructions. The processor may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums. In one embodiment, the memories of multiple devices may store the applications utilized by a sending and receiving party to send and accept a knock and receive the corresponding video and/or other communications.

Figure 2:
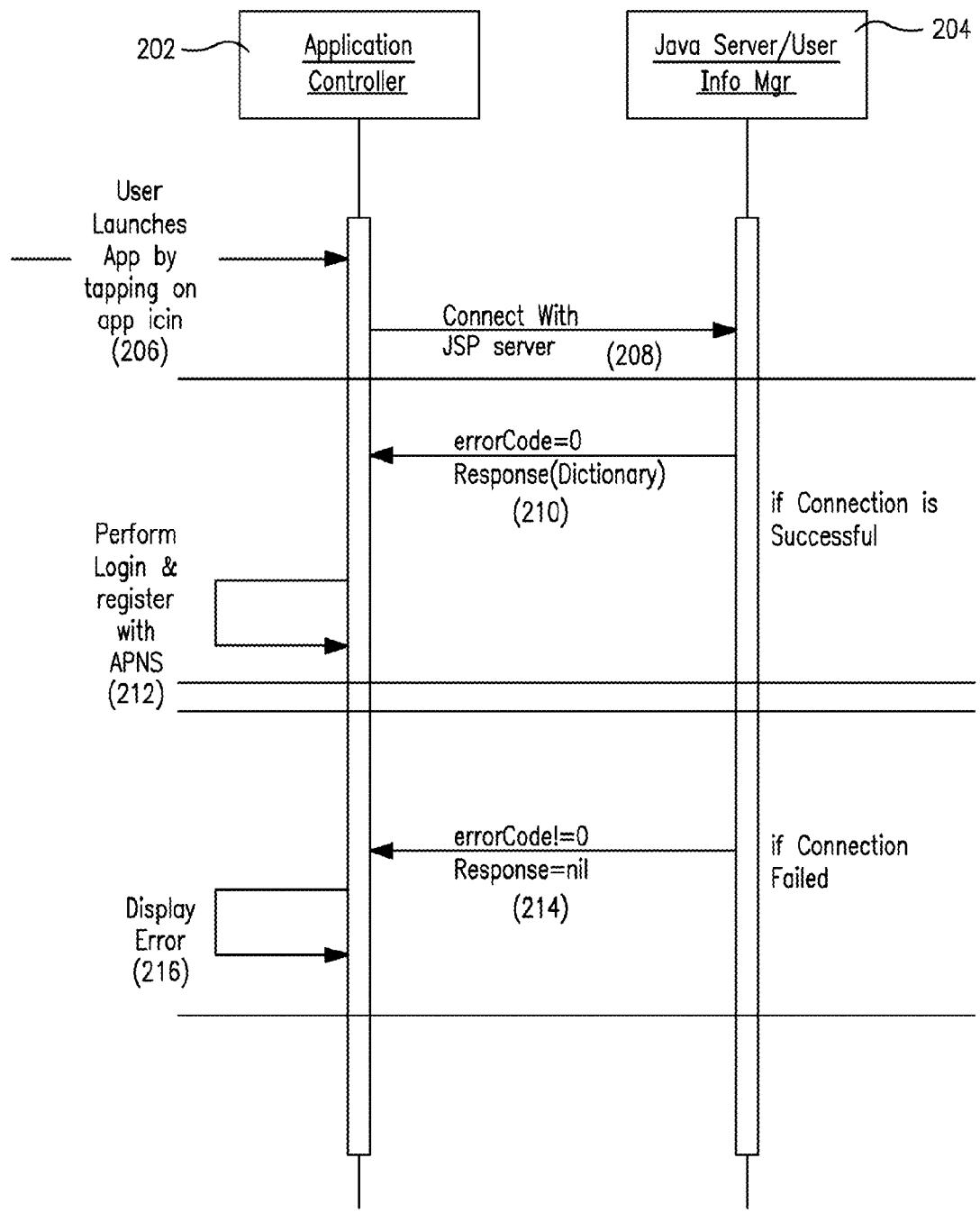
FIG. 2 is a flowchart of a process for registering a JSP server in accordance with an illustrative embodiment.

FIG. 2 is a flowchart of a process for registering a JSP server in accordance with an illustrative embodiment. The process of FIG. 2 may be implemented by an application controller 202 and a Java server (JSP server) 204. The process may begin with a user launching an application by selecting an icon (step 206). The application may also be selected through voice commands, tactile commands, or selections through a peripheral device.

Next, the application controller 202 connects with the JSP server 204 (step X208). If the connection with the JSP server 204 is successful, the JSP server 204 sends a confirmation message (210). The confirmation message indicates to the application controller 202 that the log in was successful. The application controller 202 then performs login and register with an APNS 203 (step 212).

If the connection with the JSP server 204 is not successful, the JSP server 204 sends a connection failed message (step 214). The application controller 202 displays an error message (step 216). The confirmation or error message of step 210 and 214 may utilize a flag or defined response, such as an error message (0 indicates an error, non-zero message indicates a successful connection) to indicate whether the connection between the application controller 202 and the JSP server 204 were successful.

Figure 3:
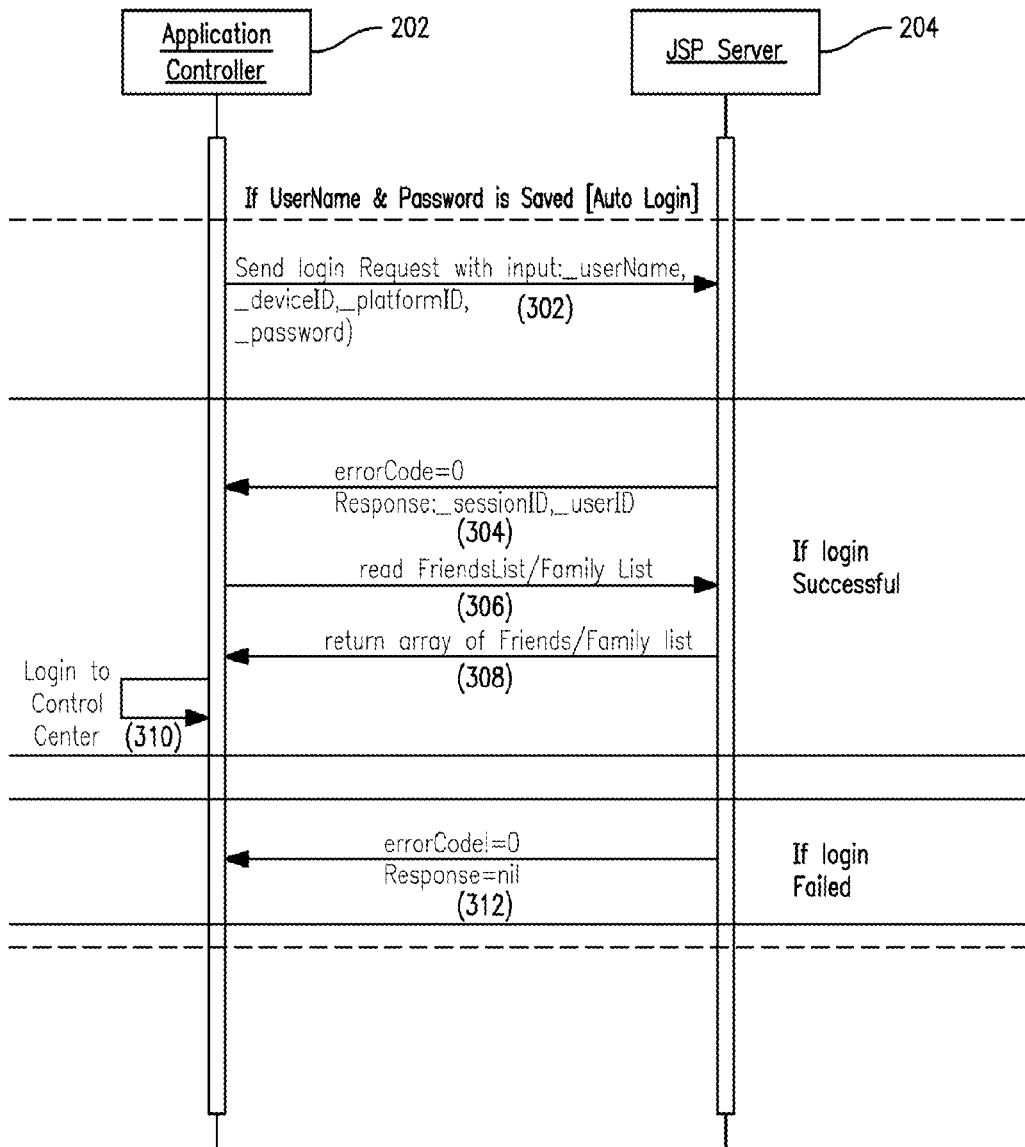
FIG. 3 is a flowchart of a process for logging in between the application controller and JSP server in accordance with an illustrative embodiment.

FIG. 3 is a flowchart of a process for logging in between the application controller 202 and JSP server 204 in accordance with an illustrative embodiment. In one embodiment, the process of FIG. 3 may be automated for an auto login process. User or device input may alternatively be required to process the login request.

The process of FIG. 3 may begin by sending login data from the application controller 202 to the JSP server 204 (step 302). The login data may include a user name, password, platform and device identifiers, login request parameters, and other similar information and data. If the login is successful, the JSP server 204 sends a confirmation message (step 304). The confirmation message of step 304 may include a session identification and user identification as well as a request for friend/family lists. In one embodiment, the friend/family list may be stored on a wireless device, within one or more applications, in a database, or a server, such as the JSP server 204. In one embodiment, the friend/family list may be contacts retrieved, uploaded, or downloaded as needed to perform the communications herein described.

Next, the application controller 202 reads the friend/family list (step 306). The friend/family list is read by the JSP server 204 as a response to the request of step 304. The JSP server 204 may then return an array of the friends/family list (step 308). The application controller 202 logs in to the controller center (step 310).

If the log in fails, the JSP server 204 sends a login failed message (step 312). The message of step 312 may be an error message that alerts the application controller 202 of the failure.

Figure 4:
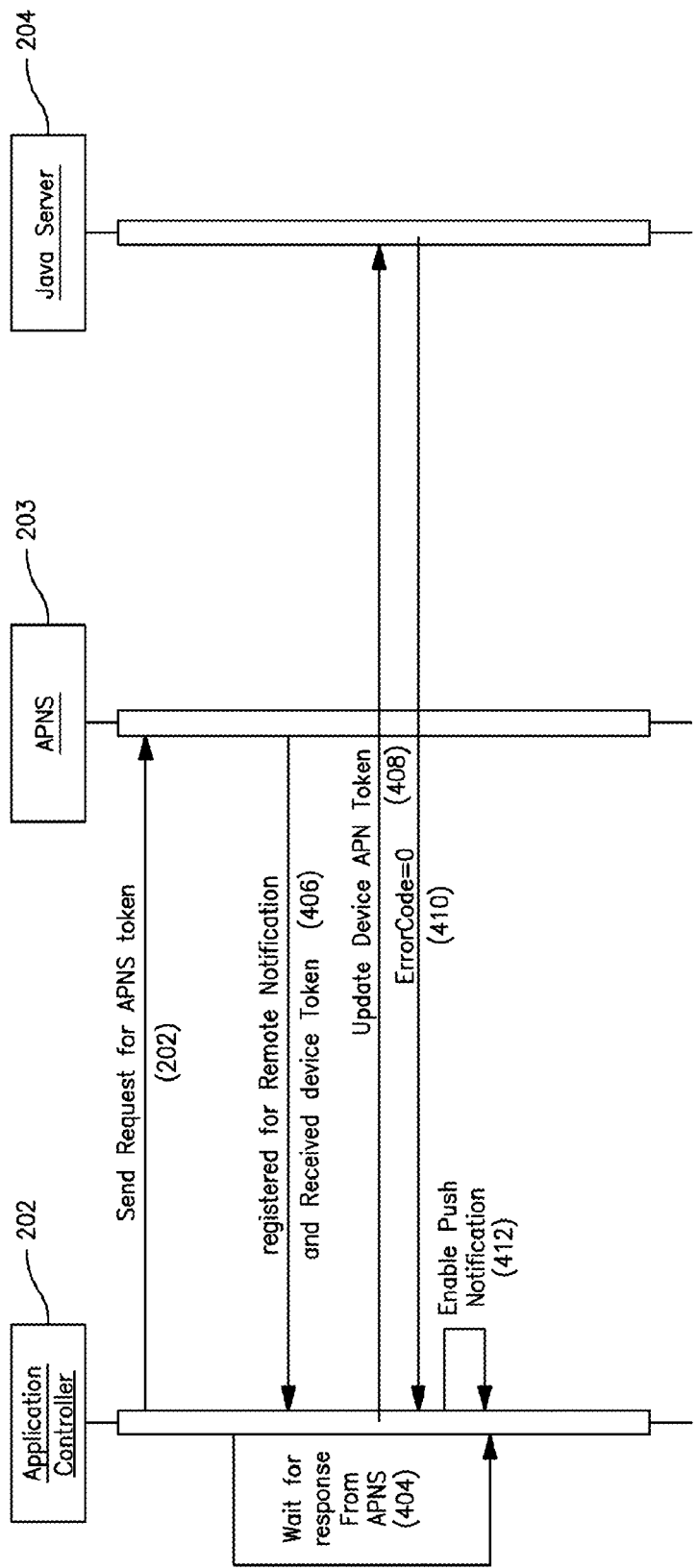
FIG. 4 is a flowchart of a process for registering for push notifications in accordance with an illustrative embodiment.

FIG. 4 is a flowchart of a process for registering for push notifications in accordance with an illustrative embodiment. The process of FIG. 4 may be implemented by the application controller 202, the APNS 203, and the JSP server 204. The process may begin with the application controller 202 sending a request for an APNS token to the APNS 203 (step 402). The application controller 202 waits for a response from the APNS 203 (step 404). The APNS 203 registers the remote device for remote notification and sends the remote device APNS token (step 406).

The application controller 202 sends the updated device APNS token to the JSP server 204 (step 408). The JSP server 204 confirms receipt of the APNS token (step 410). The confirmation of step 410 may also confirm any errors in receiving or verifying the APNS token. The APNS token is utilized for sending push notifications to an application/application controller 202. Next, the application controller 202 enables push notifications (step 412).

Figure 5:
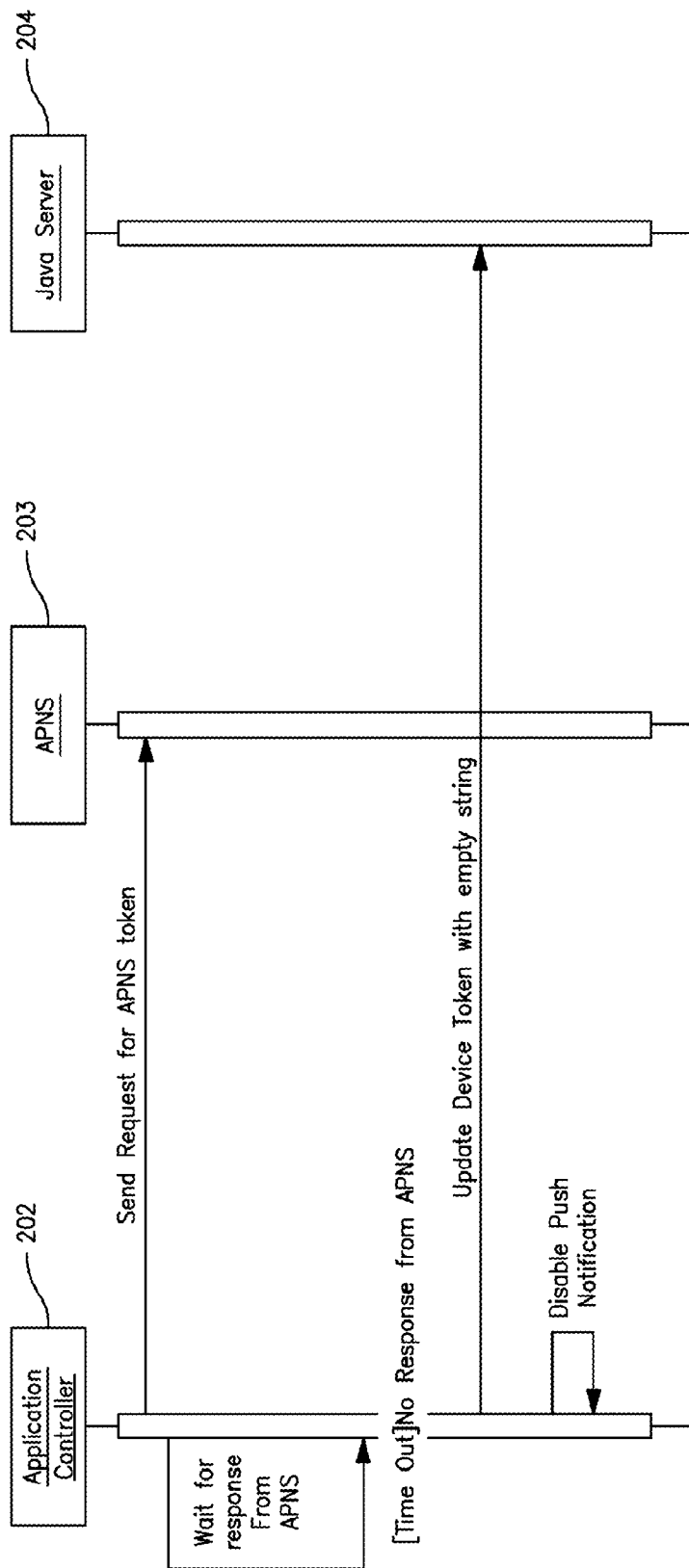
FIG. 5 illustrates a flowchart of a process showing a push notification registration failure in accordance with an illustrative embodiment.

FIG. 5 illustrates a flowchart of a process showing a push notification registration failure in accordance with an illustrative embodiment. In one embodiment, if the application controller 202 does not receive the APNS token within a time period, such as two minutes, of making the request, the application controller 202 disables push notifications.

Figure 6:
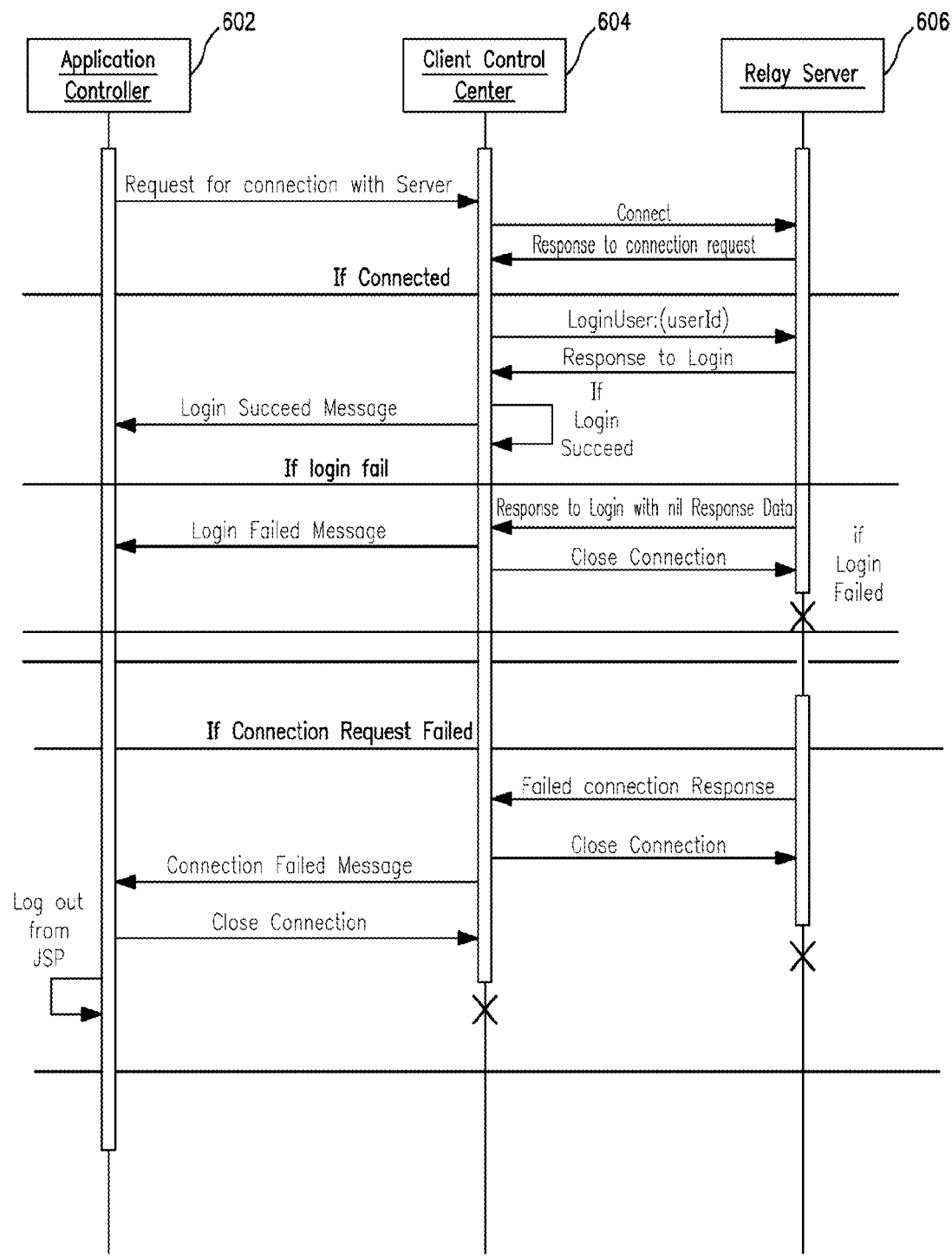
FIG. 6 illustrates a flowchart of a process for logging in to a control center in accordance with an illustrative embodiment.

FIG. 6 illustrates a flowchart of a process for logging in to a control center in accordance with an illustrative embodiment. The process of FIG. 6 may be implemented by an application controller 602, a client control center 604, and a relay server 606. FIG. 6 shows the interaction and communications between the application controller 602, client control center 604, and relay server 606.

In one embodiment, the client control center 604 of the video applications manages communications with the relay server 606. A login to the client control center 604 enables the client application to have a persistent connection with the relay server 606. The application controller 602 sends a connection request to the relay server 606 via the client control center 604. If the connection is successfully established, the client control center 604 sends a login request to the relay server 606 with parameters and a user identification. If the login is successful, the client control center may then process any pending requests or may process video sharing requests. If the connection with the relay server 606 fails or if login fails, the application controller 602 closes the connection with the relay server 606 and logs out from the JSP.

Figure 7:
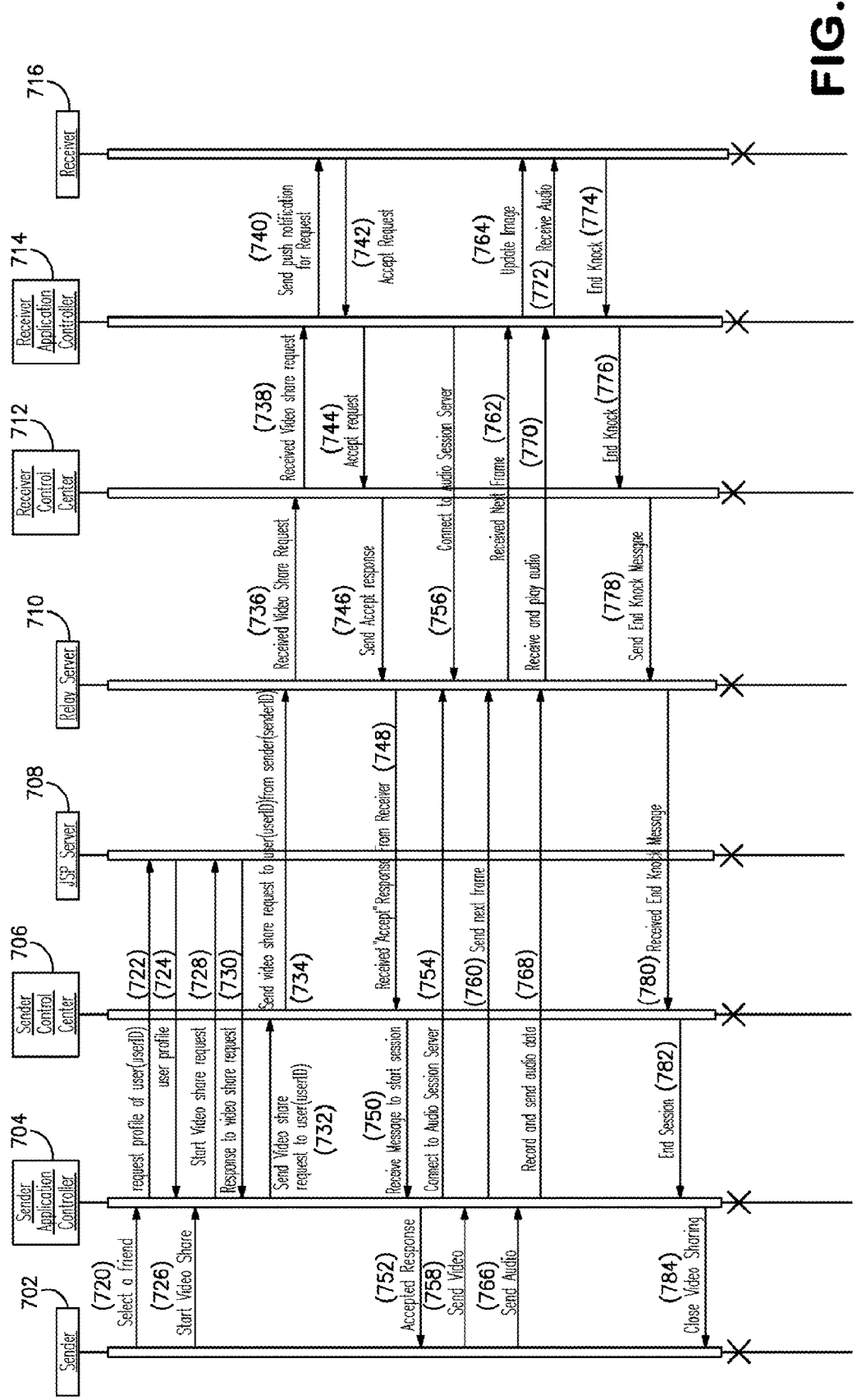
FIG. 7 is a flowchart of a process for establishing an audio and video streaming session in accordance with an illustrative embodiment.

FIG. 7 is a flowchart of a process for establishing an audio and video streaming session in accordance with an illustrative embodiment. The process of FIG. 7 may be implemented by a sender 702, a sender application controller 704, a sender control center 706, a JSP server 708, a relay server 710, a receiver control center 712, a receiver application controller 714, and a receiver 716. The process may begin with the sender 702 selecting a friend (step 720). In one embodiment, the friend may be selected from a contact list, remote or local database, associated application, or other locally or remotely accessible source. The sender application controller 704 may then request a profile of a user from the JSP server 708 (step 722). In one embodiment, the profile may include a user identification, phone number, user name or other identifying information for sending a video share request. The JSP server 708 sends the user profile to the sender application controller 704 (step 724).

Next, the sender 702 starts a video share (step 726). The video share request may be referred to as a "knock" that the receiver may be required to accept before the transmission of audio and video content may be communicated. In another embodiment, the application may include user preferences or settings that establish conditions for automatic acceptance. For example, knocks received from specified parties, such as family members, may automatically be accepted (by default) by the receiving party. In another example, knocks may be accepted at pre-defined time periods, based on determined communication information (such as IP addresses, phone numbers, usernames, identifiers, etc) specified. Bandwidth is only utilized if the knock is accepted. The sender application controller 704 may send the start video share request (step 728). The JSP server 708 sends a response to the video share request (step 730).

Next, the sender application controller 704 sends the video share request with a user identification to the sender control center 706 (step 732). The sender control center 706 sends the video share request to the relay server 710 (step 734). The relay server 710 sends the received video share request to the receiver control center 712 (step 736). The receiver control center 712 sends the received video share request to the receiver application center 714 (step 738). The receiver application controller 714 sends a push notification as a request to the receiver 716 (step 740). The sender 702 and receiver 716 may be assigned a separate port and IP address of the relay server 710 to send and receive the video data that may be transferred as TCP packets.

The receiver 716 sends an accept request message that is passed between the receiver 716 and the sender 702 (steps 742-752) as shown in FIG. 7. Next, the sender application controller 704 connects to an audio session server shown as the relay server 710 (step 754). The receiver application controller 714 likewise connects to the audio session server (step 756). The streaming audio may be assigned a separate port in the relay server 710 for the sender and receiver to write and read the audio data. In one embodiment, the audio data may be communicated as UDP packets.

Next, the sender 702 sends video to the sender application controller 704 (step 758). The sender application controller 704 sends a next frame to the relay sensor 710 (step 760). The relay sensor 710 communicates the received frame to the receiver application controller 714 (step 762). The receiver application controller 714 updates the image at the receiver 716 (step 764). Similarly, the sender 702 sends audio in a similar process as shown in steps 766-772. In steps 774-784, the knock is ended with the session being ended (step 782) and video sharing being closed (step 784).

Figure 8:
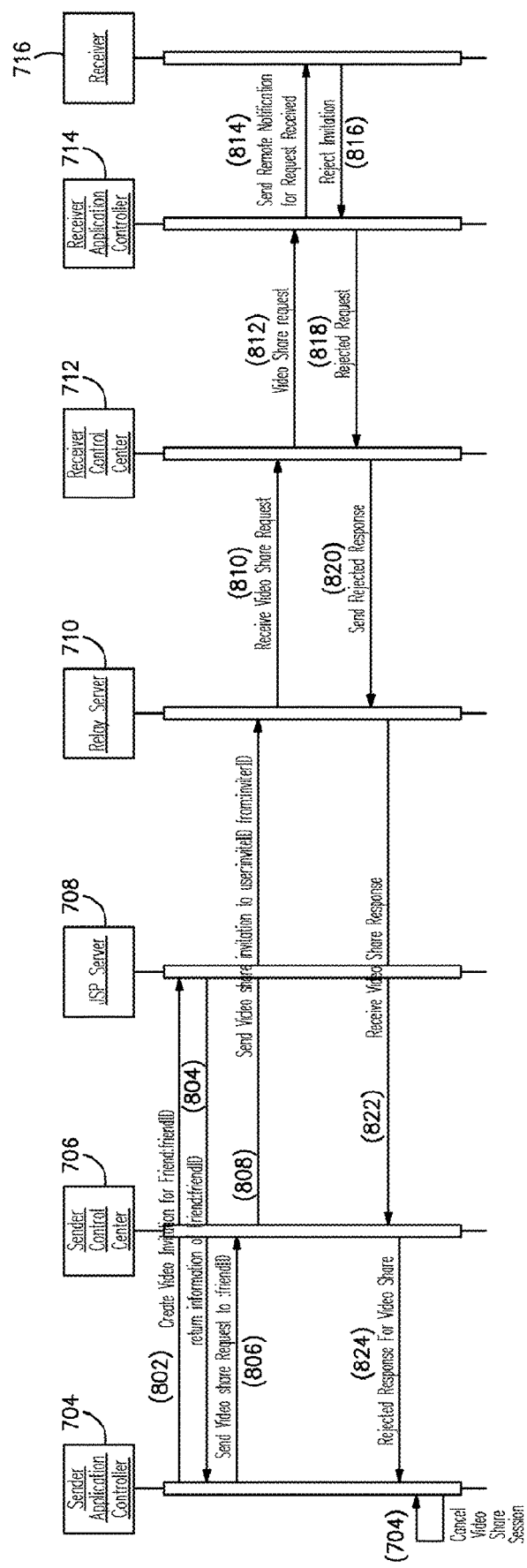
FIG. 8 is a flowchart of a process for performing a video share request rejection in accordance with an illustrative embodiment.

FIG. 8 is a flowchart of a process for performing a video share request rejection in accordance with an illustrative embodiment. The process of FIG. 8 may begin with the sender application controller 704 creating a video share invitation for a friend and communicating the invitation to the JSP server (step 802). The JSP server 708 returns information for the friend to the sender application controller 704 (step 804).

Next, the sender application controller 704 sends the video share request utilizing an identification for the friend the sender control center 706 (step 806). The video share request may be sent utilizing information and data about the friend retrieved during steps 802 and 804. The video share request is further communicated to the relay server 710, the receiver control center 712, the receiver application controller 714, and the receiver 716 in steps 808-814. If the receiver 716 automatically or manually selects to reject the invitation, the receiver 716 rejects the invitation (step 816). The rejection to the invitation is communicated back to the sender application controller 704 in steps 818-824. Next, the sender application controller 704 cancels the video share session (step 704). As a result, bandwidth is not utilized if the video share session invitation or "knock" is not accepted by the receiving party.

Figure 9:
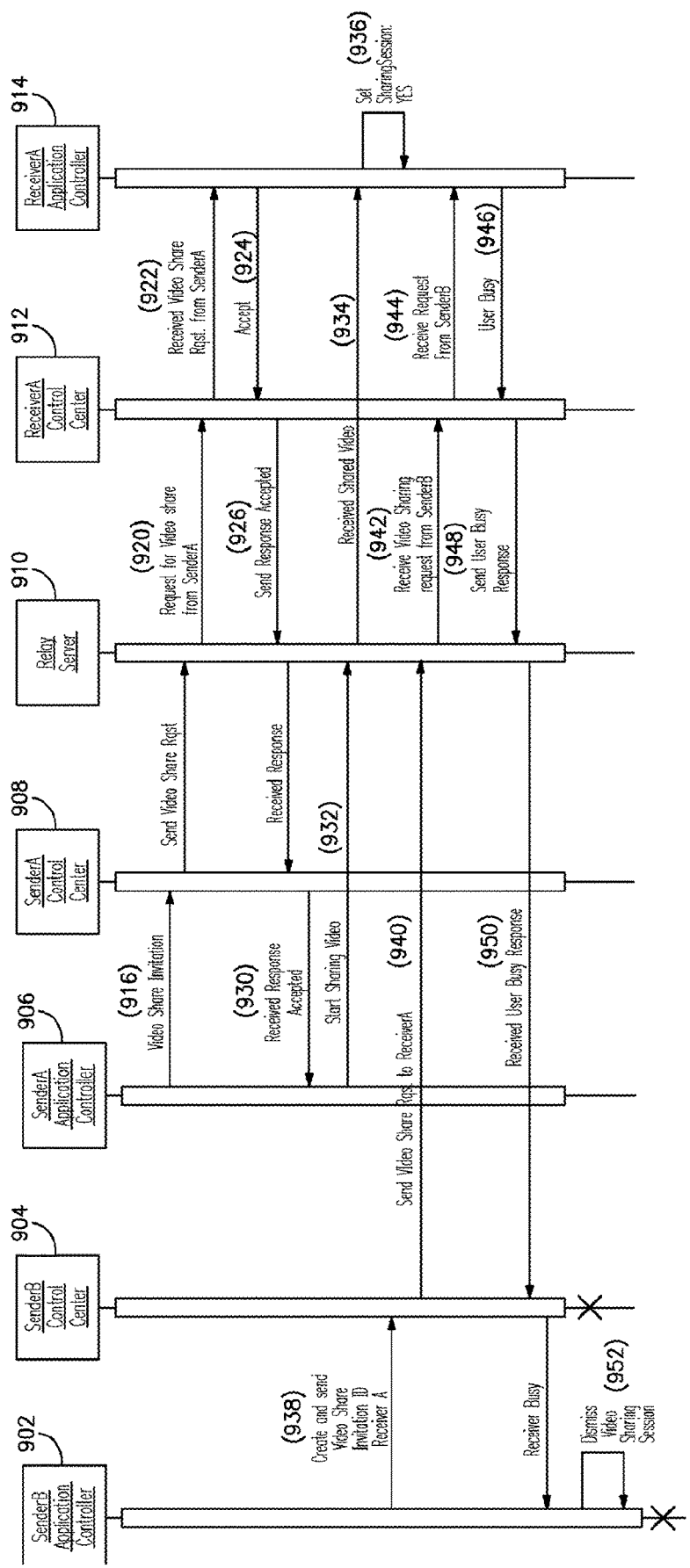
FIG. 9 is a flowchart of a process for generating a busy alert for a user in accordance with an illustrative embodiment.

FIG. 9 is a flowchart of a process for generating a busy alert for a user in accordance with an illustrative embodiment. The process of FIG. 9 may be implemented by a sender B application controller 902, a sender B control center 904, a sender A application controller 906, a sender A control center 908, a relay server 910, a receiver A control center 912, and a receiver A application controller 914.

The process may begin with the sender A application controller 906 sending a video share invitation to the sender A control center 908 (step 916). The sender A control center 908 sends a video share request to the relay server 910 (step 918). The relay server 910 sends the request for video share from sender A to the receiver A control center 912 (step 920) which is then communicated to the receiver A application controller 914 (step 922). If the video share request is accepted (step 924), the response is communicated back to the sender A application controller 906 in steps 926930.

Next, the sender A application controller 906 starts the sharing video with the relay server 910 (step 932). The relay server 910 communicates the shared video to the receiver A application controller 914 (step 934). The receiver A application controller 914 establishes the sharing session (step 936).

Next, the sender B application controller 902 creates and sends a video share invitation for receiver A and communicates it to the sender B control center 904 (step 938). The video share request is communicated to the receiver A application controller 906 in steps 940-944. The user busy message is communicated from the receiver A application controller 914 (step 946) because video is already being shared with sender A. The busy signal is sent to the sender B application controller 902 during steps 948 and 950. Next, the sender B application controller 902 dismisses the video sharing session (step 952).

The process of FIG. 9 may be utilized to ensure that multiple video/audio sessions do not occur simultaneously. This may be done to prevent overloading available bandwidth and processing power of the receiving device.

In another embodiment, video/audio sharing session may be established with multiple parties simultaneously in a multi-cast format. Likewise, a single user may receive content based on multiple knocks simultaneously. Simultaneous sharing may be especially useful when carrying on conversations or communications regarding a single subject in real-time.

Figure 18:
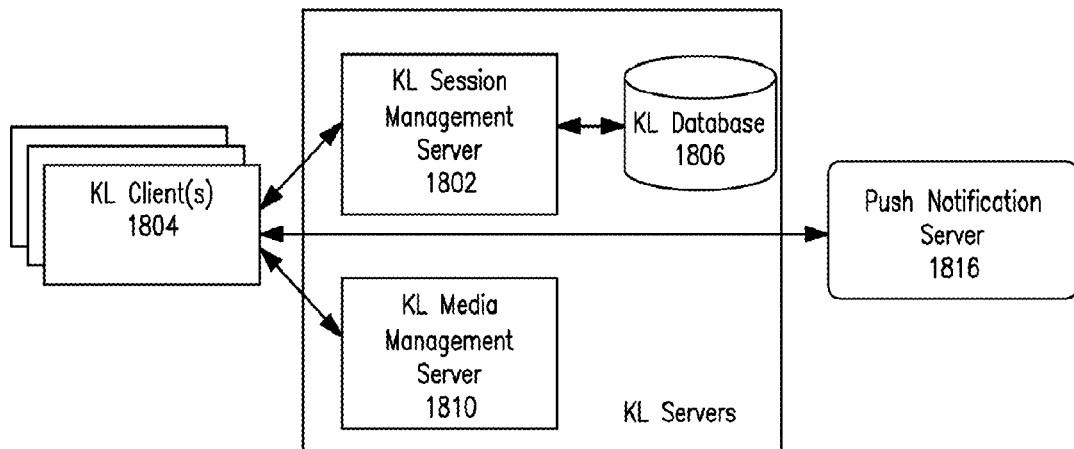
FIG. 18 is a block diagram of a Knocking Live™ (KL) system in accordance with an illustrative embodiment.

In one embodiment, for example, in a multicast format as in a point to point broadcast, the KL video transmission system can be accomplished utilizing three main components. As seen in FIG. 18 the KL video transmission system components are used for managing the session, media transmission, store and retrieve of contacts or a "friends list." KL session management server 1802, acts as a single point of contact for the KL client 1804 to perform any KL activities. It should be understood that KL client 1804 may represent multiple KL clients and is not intended to be limited to a single KL client. For example in the one to one context, KL 1804 represents two KL clients and in the one to many context, 1804 may represent tens, hundreds, thousands or millions of KL clients.

KL session management server 1802 interacts with the data base module 1806 whether to update or retrieve information from the data base. The main functionalities of the KL session management server 1802 are user registration, user login, and session management. KL media management server 1810 acts as a relay server between the KL clients 1804 during the Knocking Live session. As indicated above, the number of KL clients is not limited to any specific number of KL clients and data from KL client 1804 may be transmitted to multiple clients simultaneously and is only limited by system resources. KL media server 1810 receives the media stream from the sender and forwards the streams to the receivers. In the case of one-to-many KL media server 1810 receives media stream packets from a KL client and forwards the media stream packets to the multiple receiving clients.

In one embodiment, KL data base 1806 is basically a MY SQL database, but other database configurations and architectures are possible such as flat files, relational databases, operational or distributed. KL database 1806 is used to store a user's details (such as, for example, paid users, non-paid users, or special situations), friends list, followers list, client application's configuration details. It may also be used to store Knocking Live videos, such as, for example, short duration or long duration videos, again depending on resource availability and capabilities. KL data base 1806 interacts with a purchase module and billing systems, such as, for example, an InApp purchase and billing system (not shown). Push notification server 1816 uses APNS and Google's Android push notification service for the iPhone and Android based devices respectively, to notify the receiver about the KL session initiation (i.e., sends the knock request to the receiver to allow the receiver to start the KL application.

Figure 19:
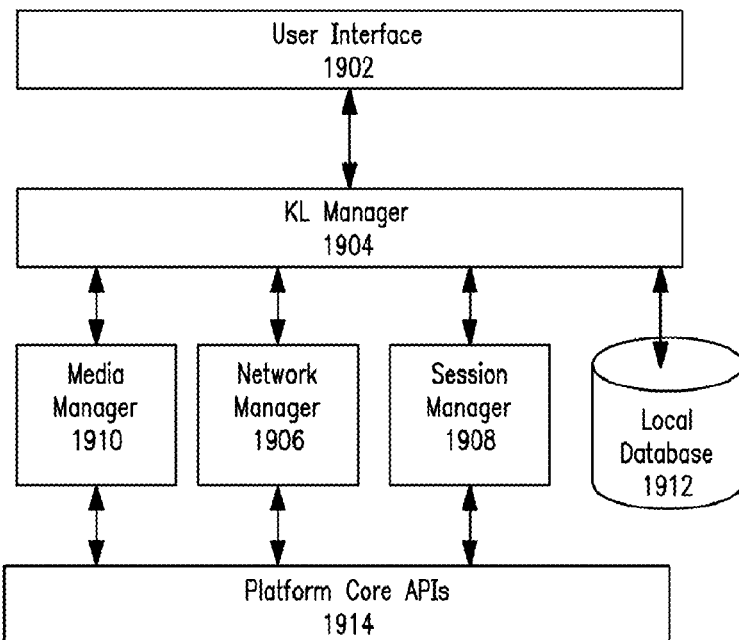
FIG. 19 is a block diagram of a KL client in accordance with an illustrative embodiment.

FIG. 19 depicts a layered architecture of the KL client, according to one illustrative embodiment. User Interface layer 1902 provides an intuitive user interface to the users to navigate within the application. KL client applications use the native platform's API to define the required user interface. KL manger 1904 act as the core component in the KL client application. KL manager 1904 can interact with all the sub modules in the KL client application and acts as centralized control unit for the KL client application. Network manager 1906 uses the native platform's API 1914 to provide the network connectivity. This module provides data connectivity through either WLAN or operator network's data connectivity (e.g., GPRS, EGPRS, 3G, EVDO). This Network manager 1906 takes care of the network failure, suspend/resume and the change over between data network technologies. Session manager 1908 is responsible for the registration of client, login and the session management during the Knocking Live session. Session manager 1908 may retrieve a friends list and a follower list. Session manager 1908 is also involved in maintaining various states, such as, for example, paid user or non-paid user, and will maintain all the session related business logistics from the client side.

Media manager 1910 interacts with the camera and the media player in the core platform or wireless device. At any point of time media manager 1910 can perform as a receiver or a sender. During receive mode it invokes the media player and decodes the received stream content and plays the same. As a sender media manager 1910 invokes the camera on the wireless device and encodes the video content and streams the content through the network module. Local database 1912 is located in the wireless device and is used to store the KL client application's configuration details, friends list followers list, history, and other configuration information. While a specific configuration for the client has been described, it will be appreciated by those skilled in the art, other configurations may be utilized without departing from the spirit of the disclosed embodiment.

Figure 20:
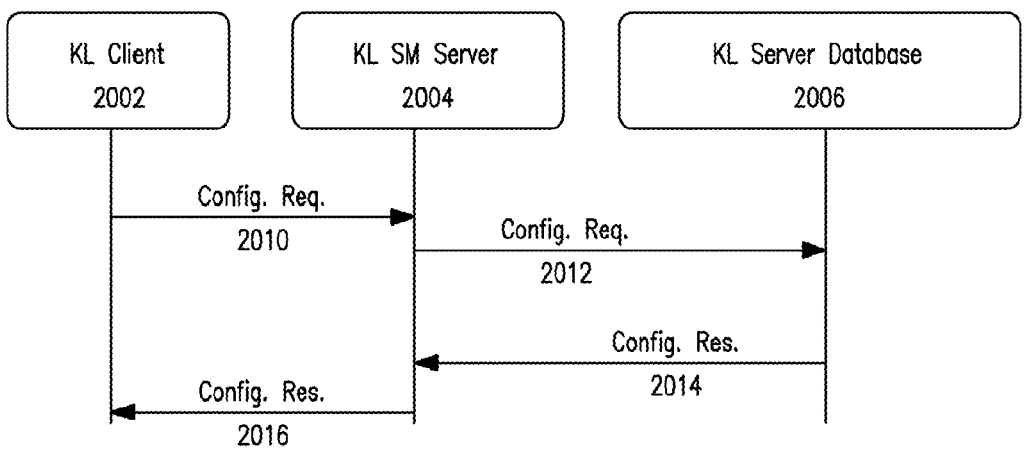
FIG. 20 is a flowchart of a process for launching a KL application resident on a user's device in accordance with an illustrative embodiment.

FIG. 20 depicts a sequencing diagram for launching the KL application on the wireless device in one particular embodiment. KL client 2002, typically resident in a mobile device, sends a configuration request 2010 to session management server 2004 over an HTTP protocol. Configuration request 2010 contains the details about the KL client device such as model number, platform version details, and other device information. Session management server 2004 process request 2010 and checks with data base server 2006 via request 2012 for the client configuration details. Database server 2006 responds with the respective configuration details in configuration response 2014 that include media server details, push notification and other configuration parameters. Session management server 2004 forwards the configuration response message 2016 to KL client 2002. Upon receipt of the configuration details, KL client application 2002 stores the required details in its local database 1912.

Figure 21:
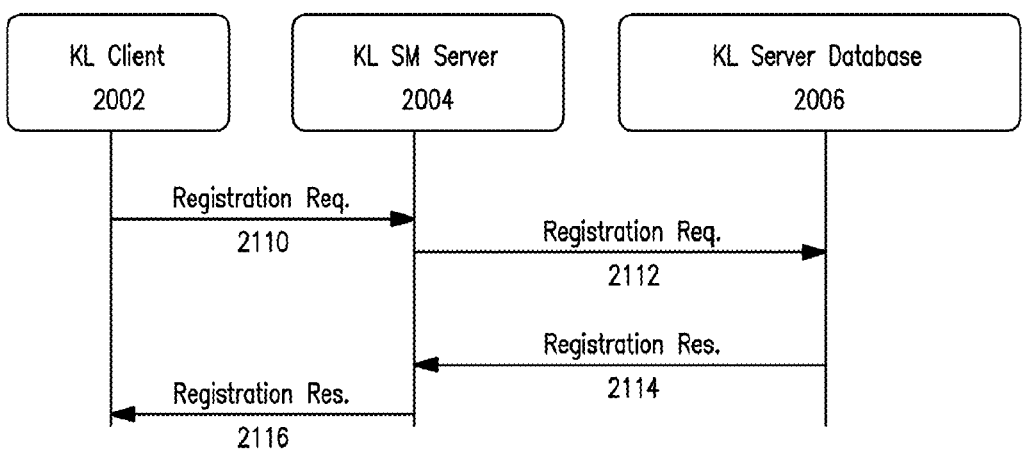
FIG. 21 is a flowchart of a process for registering a KL application in accordance with an illustrative embodiment.

FIG. 21 depicts a sequencing diagram for a KL user's registration in accordance with one embodiment. Users can register with the KL session management server 2004 with a user name and password. The KL client 2002, resident on a mobile device provides an option for the user to provide the basic information (e.g., name, contact details, mode of operation, paid/non-paid) to the KL server. After entering the required fields from the registration screen, the KL client 2002 sends a registration request 2110 to KL session management server 2004 over an HTTP protocol. KL session management server 2004 evaluates the request details and pushes the necessary details to the KL server database 2006 via request 2112. If the user name does not exist KL server database provides registration success response 2114 to the user. Registration response message 2114 may include information as to whether the user registration is successful or has failed. This information is conveyed in response 2116 which is sent from KL session management server 2004 to KL client 2002.

Figure 22:
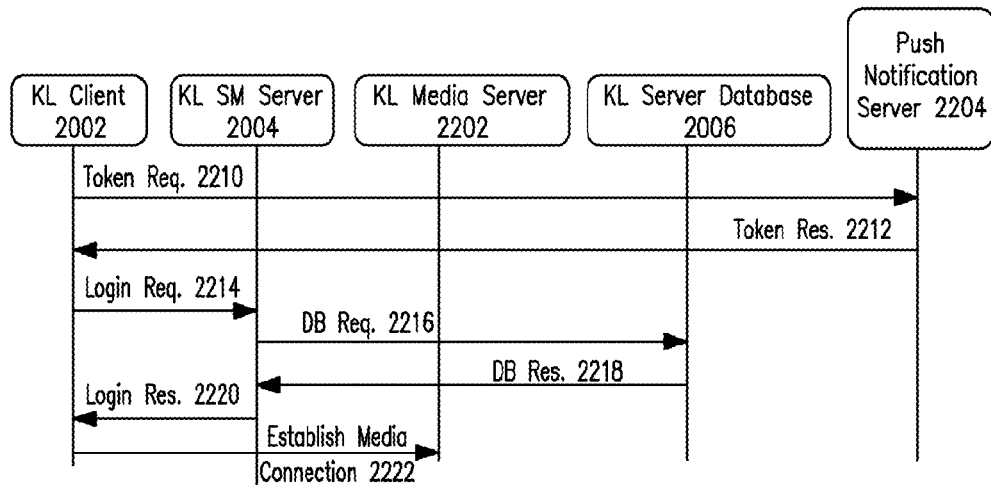
FIG. 22 is a flowchart of a process for logging on to a KL system in accordance with an illustrative embodiment.

FIG. 22 depicts a sequencing diagram for a KL user login sequence, according to one embodiment. After successful registration, a user can login to the system to begin a Knocking Live session. Once a user successfully enters login and password details, the KL client 2002, on the mobile device, sends a token request message 2210 to the push notification server 2204. Push notification server 2204 provides a unique ID to the KL client via token response 2212. KL client 2002 then responds by sending the unique ID and login credentials to the KL session management server 2004 via login request 2214. KL session management server 2004 checks the credentials with the KL server database 2006 by sending database request 2216. KL database server 2006 responds to KL session management server's 2004 request by sending database response 2218. KL session management server 2004 sends login response message 2220 to the KL client 2002. Message 2220 indicates whether the login was a success or a failure. If login response message 2220 indicates a successful login, KL client 2002 establishes a connection to KL media server 2006. If the KL client does not support push notification, login may proceed directly after the login credentials are received at KL session management server 2004.

Figure 23:
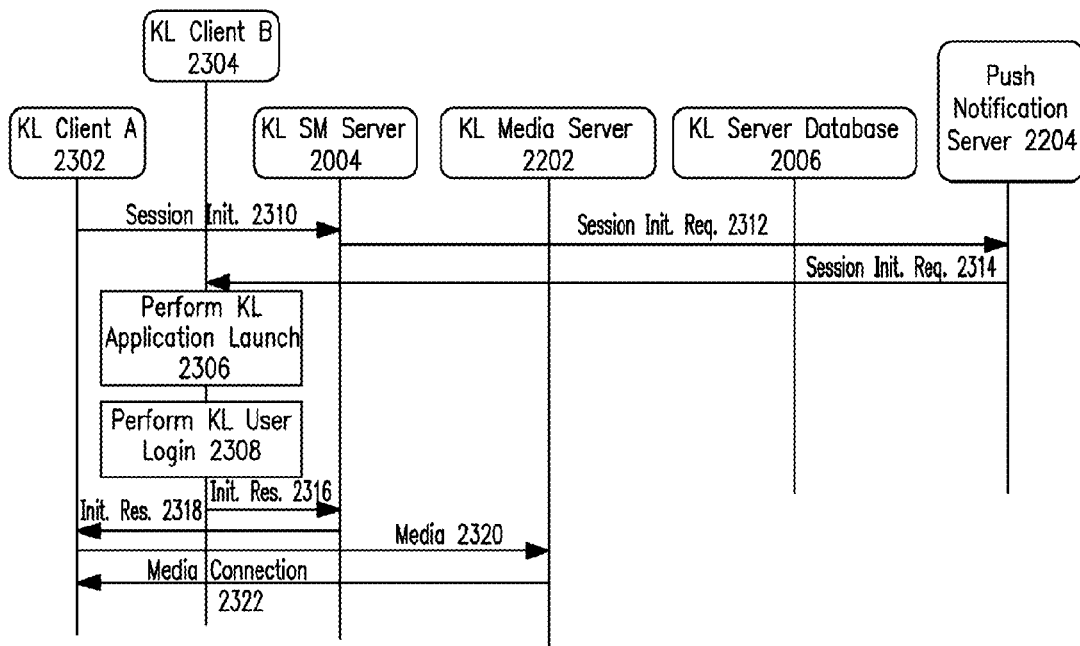
FIG. 23 is a flowchart of a process for initiating and broadcasting a KL session in accordance with an illustrative embodiment.

FIG. 23 depicts a sequencing diagram for a KL session between two KL clients, according to one embodiment. The sequence diagram for the Knocking Live session depicted in FIG. 23 represents two users, KL User A represented by client A 2302 wishing to send knocking live video to KL User B represented by client B 2304. In this sequencing diagram, client B 2304 is offline and not actively logged in to the Knocking Live application. In operation, client B 2304 will receive a session initiation request that must either be accepted or rejected or ignored by User B. If User B decides to ignore the request or reject the request, no Knocking Live video will be sent to User B. If User B decides to accept the Knocking Live request, then User B's application will launch and, if sign in is successful, User B will begin to receive video from User A.

It will be appreciated by those skilled in the art, that the embodiment is not limited to two users, a single sender and a single recipient, but can be utilized by many recipients simultaneously and is only limited by system resources. Accordingly, it will be understood by those skilled in the art, that KL client B 2304 may represent a single client or a plurality of clients and accordingly, a plurality of devices. User A's KL client A 2302 sends a session initiation request 2310 to the KL session management server 2004. KL session management server 2004, checks the credentials and the service type of KL client A 2302 with the KL database server 2206 and sends a session initiation request message 2312 to push notification server 2204. Push notification server 2204 forwards the session init request 2314 containing the message ID and the session details to KL client B 2304. Upon receipt of the push notification, User B must decide to either accept the knock and launch the KL application 2306 in order to begin receiving content from User A or reject the knock, in which case User B will not receive any content from User A. If User B wishes to accept the knock and launches the KL application 2306 and logs into the system 2308 KL client B 2304 will send a service accept or initiate response message 2316 to the KL session management server 2004. KL session management server 2004 will update the KL server database 2006 about the session details and forward a session acceptance message 2318 to KL client A 2302. Upon successfully receiving the session acceptance message, KL client A 2302 will stream the media streams 2320 to KL media server 2202. KL media server 2202 will then forward via media stream 2322 the same media to KL client B 2304.

In the case of conveying content from a single client to multiple viewers, push notification server 2204 forwards the session init request 2314 containing the message ID and the session details to all the prospective KL clients and the process repeats for all the intended clients. That is, each prospective recipient user must accept the session initiation request 2314 or knock, and then initiate the KL application launch 2306 from their respective devices. At that point each recipient device will send a service accept or initiate response message 2316 to the KL session management server 2004. KL session management server 2004 will update the KL server database 2006 about the session details and forward a session acceptance message 2318 to KL client A 2302. Upon successfully receiving the session acceptance message, KL client A 2302 will stream the media streams 2320 to KL media server 2202. KL media server 2202 will then forward via media stream 2322 the same media to all clients that accepted the session initialization request 2314. In the case where there are a large number of intended recipients, it may not be necessary to alert user A as to the status of all intended recipients, i.e., who accepted and who rejected.

Figure 10:
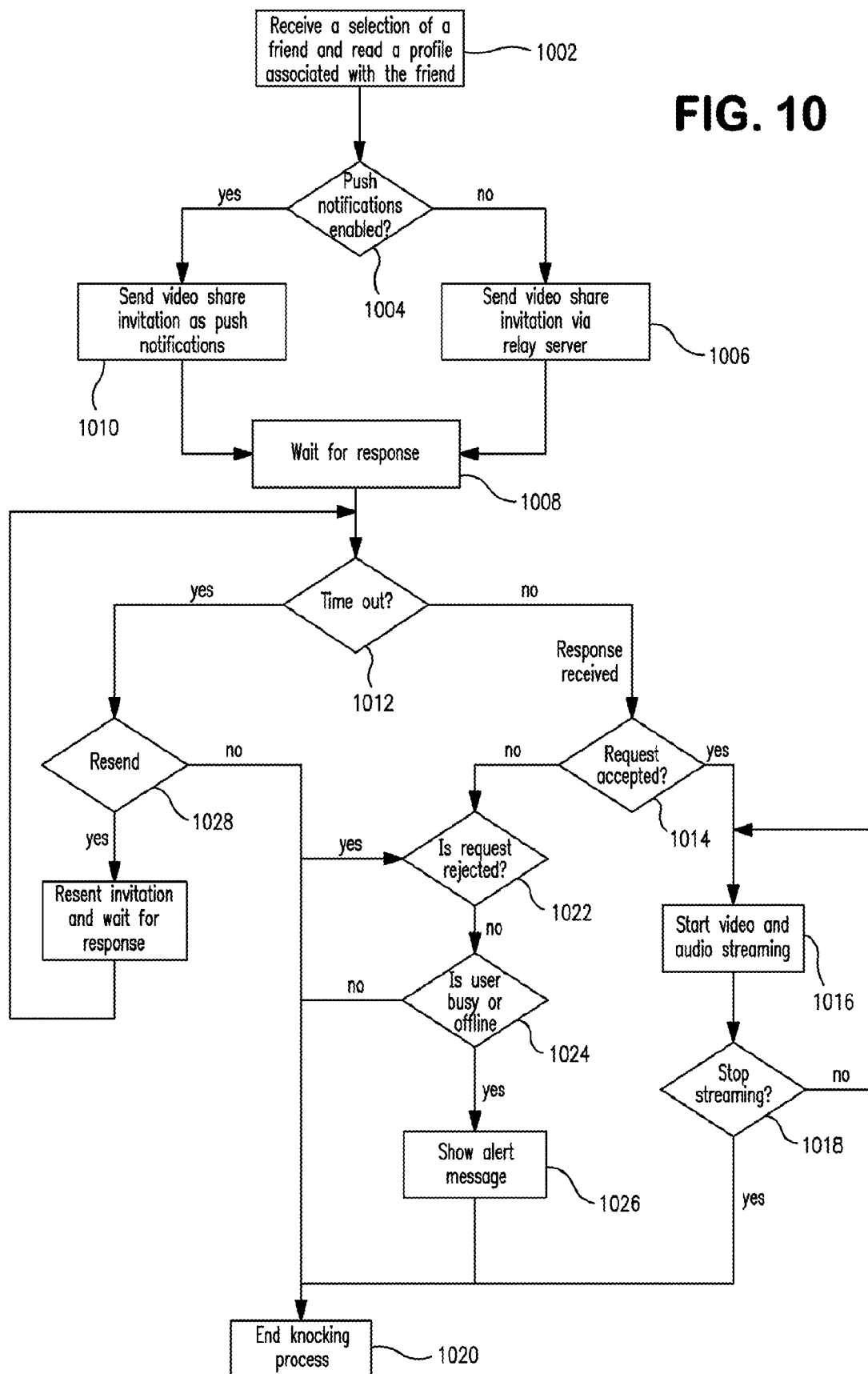
FIG. 10 is a flowchart of a process for conditionally streaming video in accordance with an illustrative embodiment.

FIG. 10 is a flowchart of a process for conditionally streaming video in accordance with an illustrative embodiment. The process of FIGS. 10 and 11 may be implemented by a system, such as those shown in FIGS. 1-9. The processes may be utilized to stream video (audio and video) to another party in a knocking process.

The process of FIG. 10 may begin by receiving a selection of a friend and reading a profile associated with the friend (step 1002). The profile may include contact information, a user name, and other information for identifying and communicating with the specified friend. Next, the system determines whether push notifications are enabled. If push notifications are not enabled, the systems sends a video share invitation via a relay server (step 1006). The invitation may be any number of messages, alerts, or communications that indicate or present an invitation to the receiving party. Next, the system waits for a response (step 1008).

If the push notifications are enabled in step 1004, the system sends a video share invitation as a push notification (step 1010). Next, the system waits for a response (step 1008). The system determines whether there is a time out (step 1012). If there is not a time out, the system determines whether the request is accepted (step 1014). If the request is accepted, the system starts video and audio streaming (step 1016). The system determines whether to stop streaming (step 1018). The streaming process continues as long as the video stream submitted by the sending party is sent and there are no errors or problems with the connection or content.

If the system determines to stop streaming in step 1018, the knocking process ends (step 1020). If the system determines the request is not accepted in step 1014, the system determines whether the request is rejected (step 1022). If the request is rejected, the system ends the knocking process (step 1020). If the request is not rejected in step 1022, the system determines whether the user is busy or offline (step 1024). The request may have been rejected by the user. If the user is busy or offline, the system shows an alert message (step 1026). During step 1024, the alert message may be displayed to the sending party and/or the receiving party. If the user is not busy or offline in step 1024, the system ends the knocking process (step 1020).

If there is a time out in step 1012, the system determines whether to resend (step 1028). The determination of step 1028 may be performed utilizing logic, user preferences, and other information. For example, initial and follow-up invitations based on a single request from the sending party may only be sent or resent three times before the knocking process is automatically ended. If the system determines not to resend, the system ends the knocking process (step 1020). If the system determines to resend in step 1028, the system resends the invitation and waits for a response (step 1030). Next, the system determines whether there was a time out (step 1012).

Figure 11:
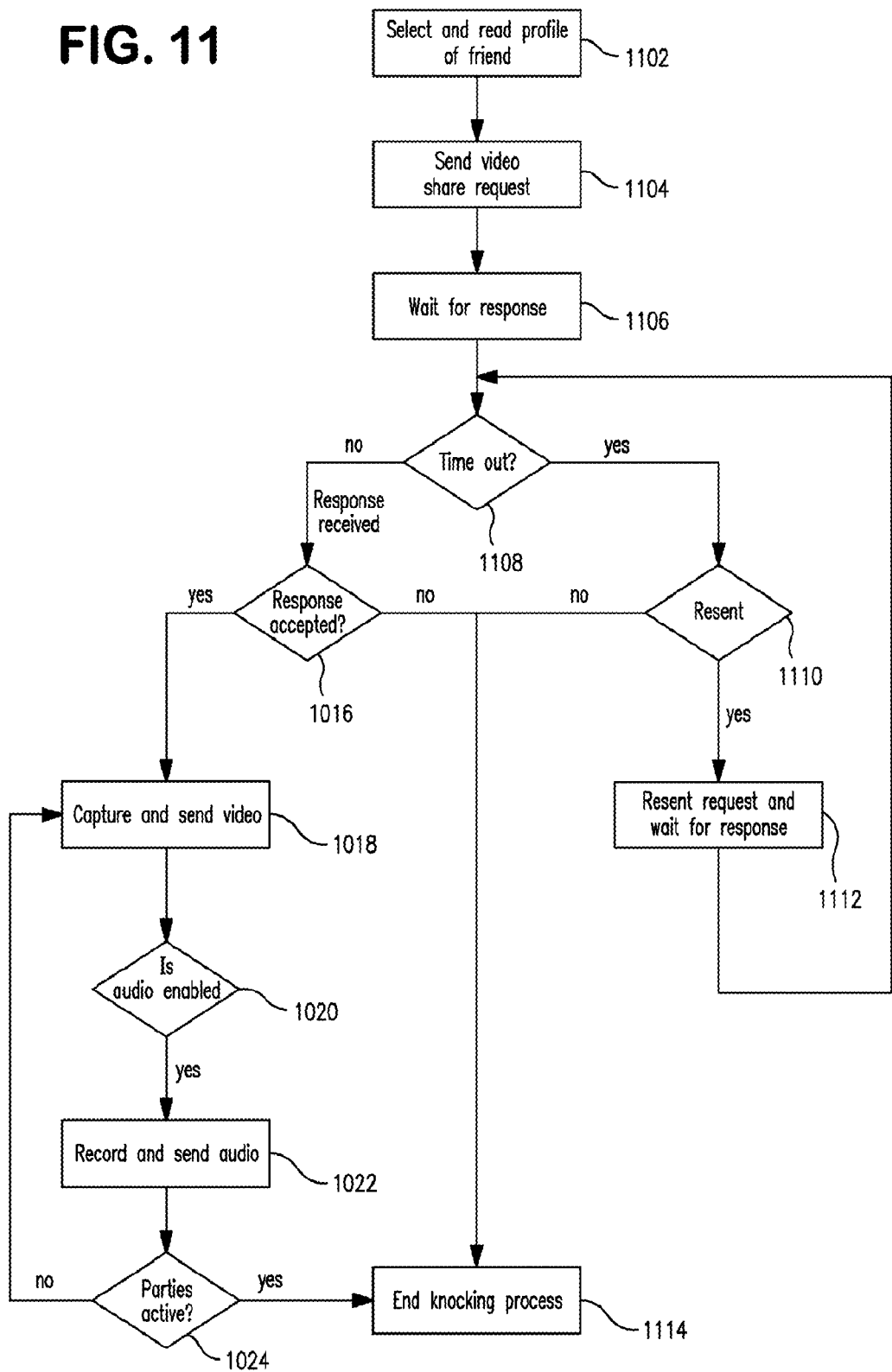
FIG. 11 is a flowchart of a process for streaming video in accordance with an illustrative embodiment.

FIG. 11 is a flowchart of a process for streaming video in accordance with an illustrative embodiment. The process may begin by selecting and reading a profile of a friend (step 1102). Next, the system sends a video share request (step 1104). The system waits for a response (step 1106). The system determines whether there is a time out (step 1108). If there is a time out, the system determines whether to resend (step 1110). If the system determines to resend, the system resends the request and waits for the response (step 1112) before returning to determine whether there is a time out (step 1108). If the system determines not to resend, the system ends the knocking process (step 1114).

If there is not a time out during step 1108, the system determines whether the response is accepted (step 1116). If the response is not accepted, the system ends the knocking process (step 1114).

If the response is accepted in step 1016, the system captures and sends the video (step 1018). The system may also determine whether audio is enabled (step 1020). If audio is not enabled, no audio is included in the streamed video. If audio is enabled in step 1020, the system records and sends audio (step 1022). Next, the system determines whether the parties are active (step 1024). For example, the parties may not be active if one or more selects to stop streaming or receiving the video/audio content. Alternatively, the line may fail ending the process. If the system determines the parties are not active, the system ends the knocking process (step 1114). If the system determines the parties are still active in step 1024, the system continues to capture and send video (step 1018).

Figure 12:
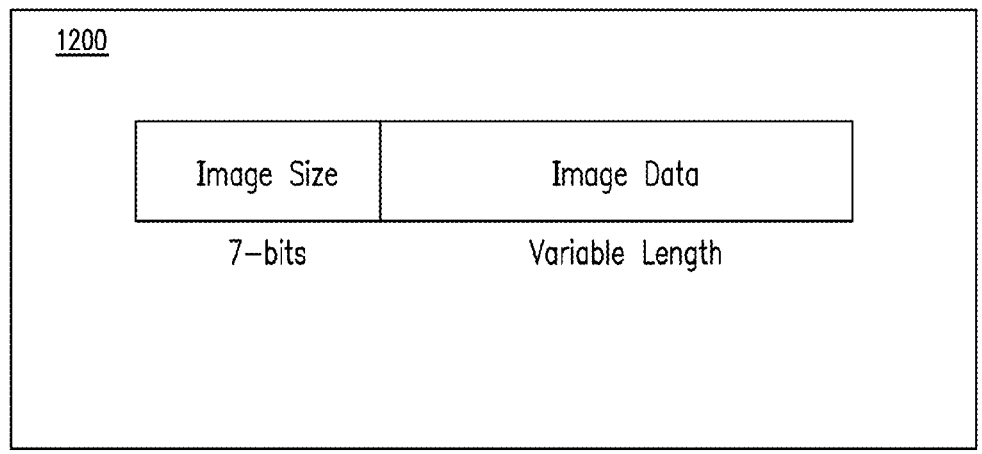
FIG. 12 is a pictorial representation of a video packet 1200 in accordance with an illustrative embodiment.

FIG. 12 is a pictorial representation of a video packet 1200 in accordance with an illustrative embodiment. In one embodiment, the video and audio data will be sent as TCP and UDP packets, respectively. In one embodiment, the video packet 1200 may be formatted to include 7-bits specifying the image size and a variable length of bits/bytes corresponding to the image data (or actual data).

In one embodiment, the video is transferred as a serial set of images, thus each video packet 1200 may include a single image from the series.

Figure 13:
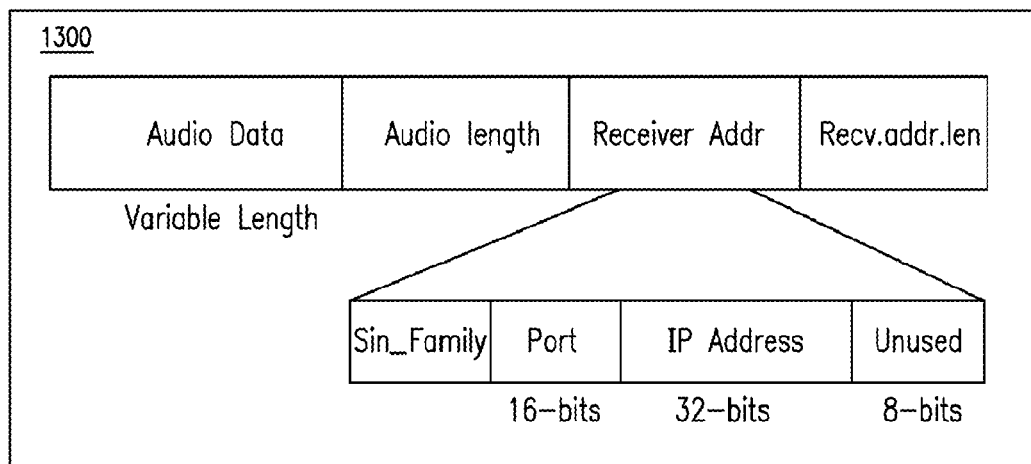
FIG. 13 is a pictorial representation of an audio packet in accordance with an illustrative embodiment.

FIG. 13 is a pictorial representation of an audio packet 1300 in accordance with an illustrative embodiment. The first bytes of the packet or message may include the audio data, followed by the size of the audio transferred (or audio length). The body of the packet may include the address of the receiver and size address data in bytes. The body may further include the name of the receiving party, the port through which the packet is passed, an IP address, and other bits that may remain unused or used as needed. The final bytes may specify the address of the sender. The packetization may be performed as shown.

Figure 14:
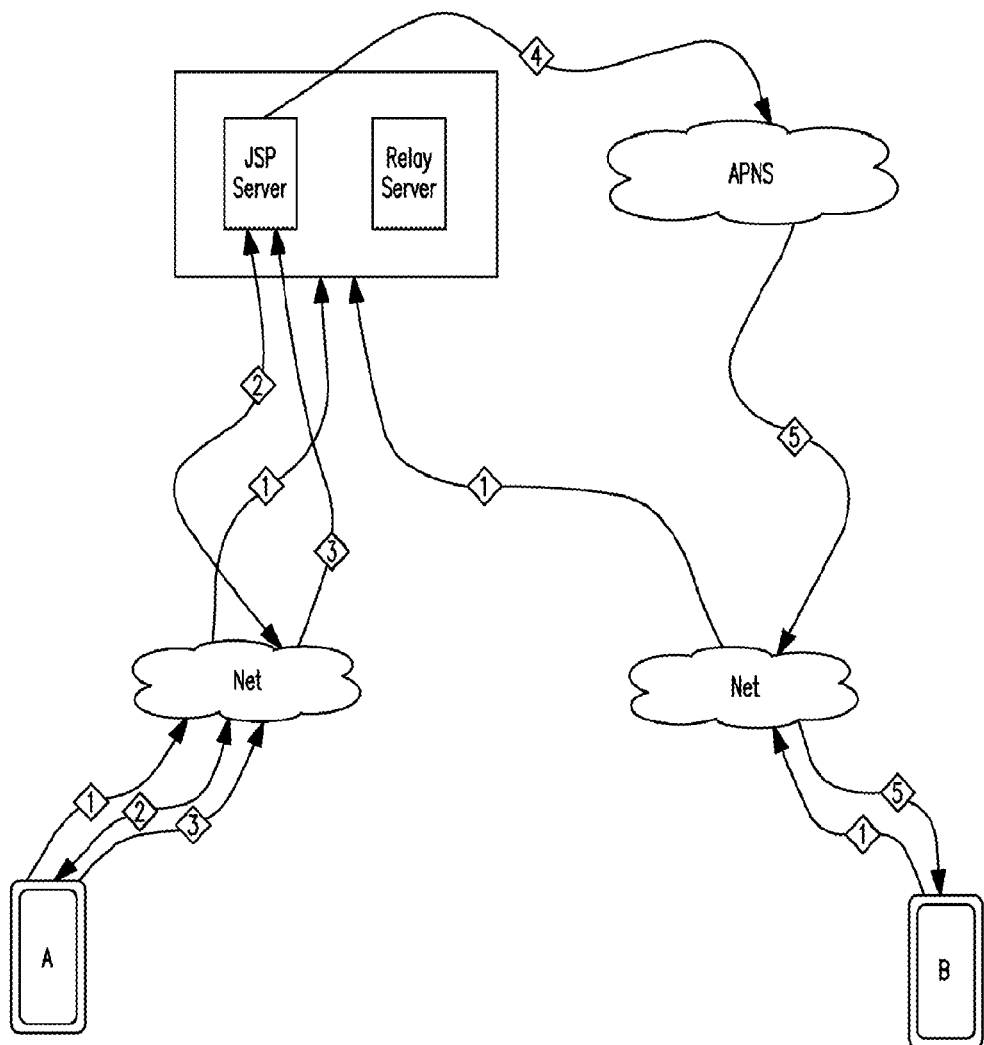
FIG. 14 is a pictorial representation of APNS notifications in accordance with an illustrative embodiment.

FIG. 14 is a pictorial representation of APNS notifications in accordance with an illustrative embodiment. In the systems and methods for knocking video herein described, various embodiments may be utilized to push notifications. In the first embodiment, the push notifications occur utilizing APNS notifications as shown in FIG. 14. In a second embodiment, the knocking notifications may be communicated via a relay server as shown in FIG. 15.

The process of FIG. 14 may be utilized when both the sender and the receiver are iphone (or iphone compatible) devices and registered for push notifications with APNS. The devices (User A and B) register with both JSP and relay servers (1). User A initiates knocking and request the JSP server provide the profile of User B (2). User B has previously registered for push notification, and, as a result, User A asks the JSP server to send the knocking request to User B (3). The JSP server asks the APNS to send the knocking request as a push notification to User B (4). The APNS sends the knocking request to User B, the response to the knocking notification is also sent to User A as a push notification by the APNS (5). User A and User B may subsequently stream video as previously described.

Figure 15:
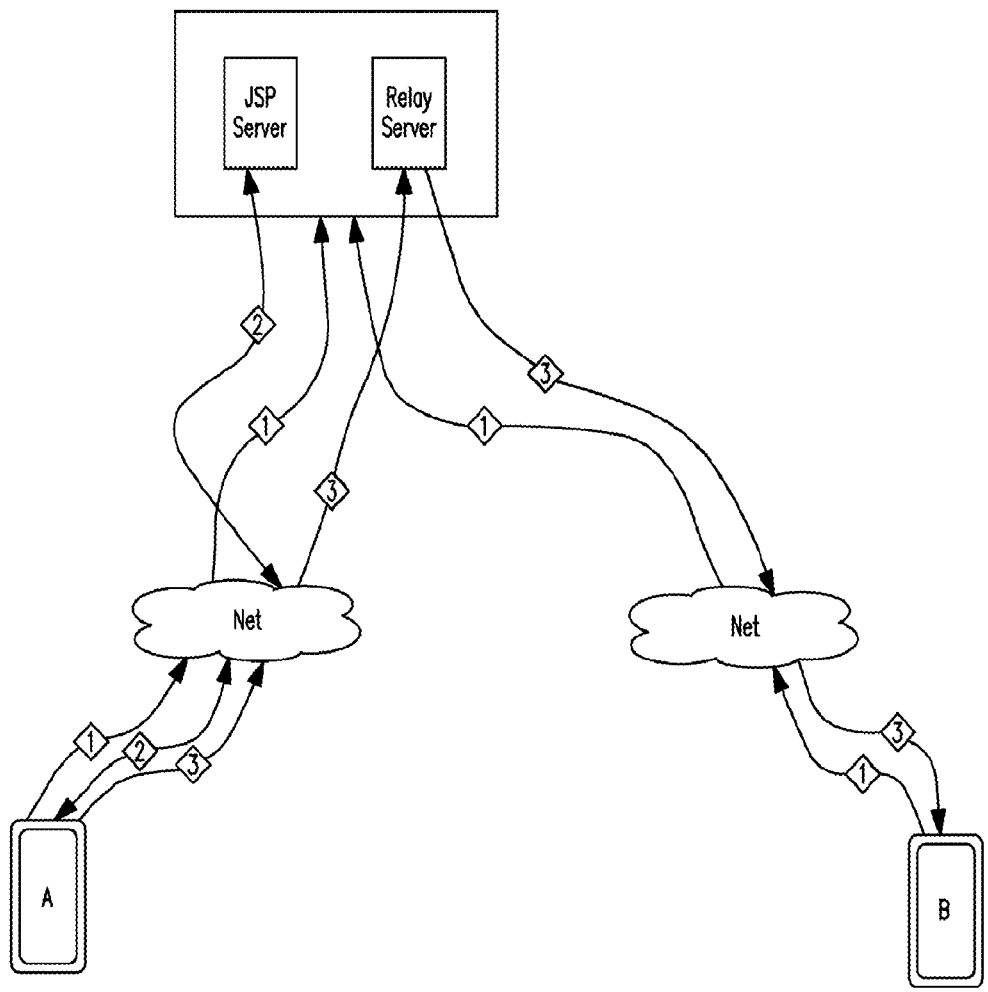
FIG. 15 is a pictorial representation of a knocking notification via a relay server in accordance with an illustrative embodiment.

FIG. 15 is a pictorial representation of a knocking notification via a relay server in accordance with an illustrative embodiment. The process of FIG. 15 may be utilized when the receiver is either an Android, jail-broken device, device utilizing network address translation, or other similar computing or communications devices.

The devices register with both JSP and relay servers (1). User A initiates knocking and request the JSP server provide the profile of User B (2). User A requests the relay server send the knocking notification to User B (3) because User B does not support APNS push notifications.

Figure 16:
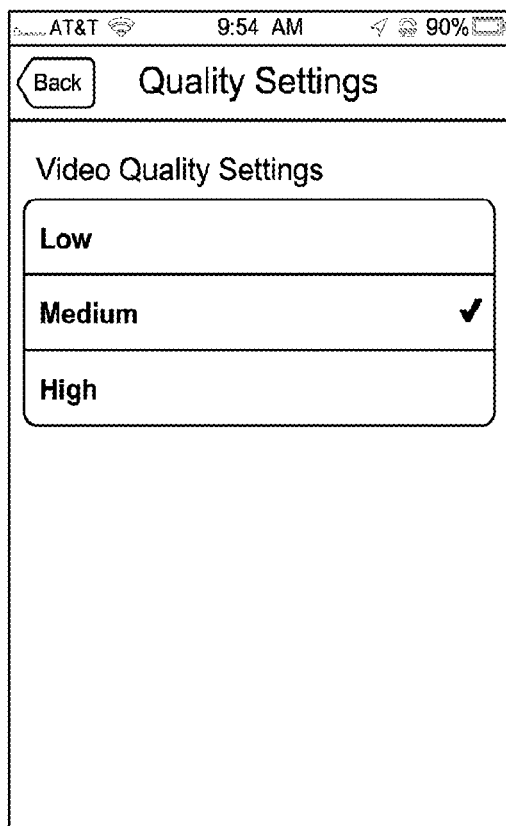
FIG. 16 is a pictorial representation of an interface for setting quality settings in accordance with an illustrative embodiment.

FIG. 16 is a pictorial representation of an interface for setting quality settings in accordance with an illustrative embodiment. In one embodiment, the user may select a low, medium or high quality settings. The settings may be selected to conserve bandwidth or processing power or in order to best meet the user and device circumstances. In another embodiment, the quality settings may be set automatically based on logic or algorithms that maximize performance of the wireless device as well as communicated video. For example, the resolution may be set to low when the signal strength is low. The quality settings may allow resolution, pixel size, refresh rate, and other similar factors affecting video to be individually adjusted.

In one embodiment, the video (or resolution) quality may be reduced so that audio may be continued to be transmitted. In another embodiment, the video may freeze a frame of the video (i.e. a still picture) while still communicating audio to provide the feel of video. The frozen image may be updated periodically or as bandwidth allows to maximize the user experience.

Figure 17:
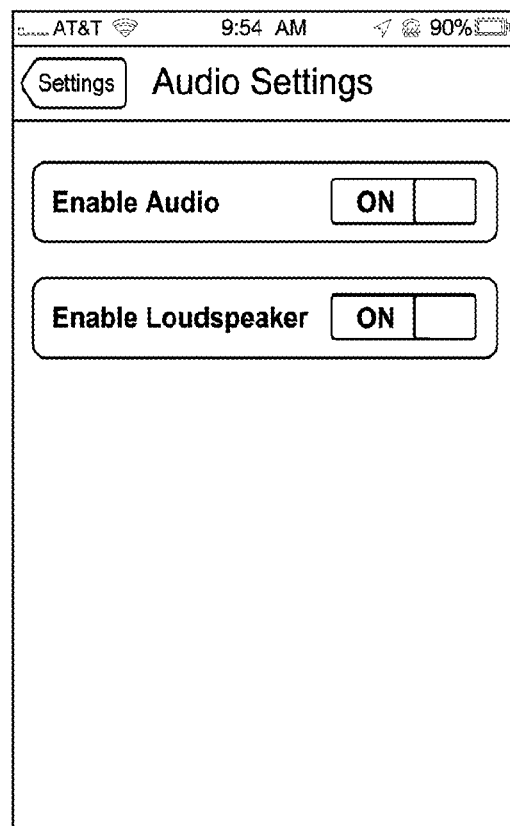
FIG. 17 is a pictorial representation of audio settings for enabling or disabling audio in accordance with an illustrative embodiment.

FIG. 17 is a pictorial representation of audio settings for enabling or disabling audio in accordance with an illustrative embodiment. A similar user interface may be available for enabling or disabling video during transmission to conserve bandwidth. In one embodiment, the audio and video recorded or streamed from the sending party may be sent together or separately. For example, multiple channels or a single channel may be utilized for the video and audio. In one embodiment, transmission of the packets may be synchronized even if there are sent as separate packets in separate channels. In yet another embodiment, the packets may be synchronized once received at the receiving device so that the audio and video are more closely aligned.

In one embodiment, the audio may be turned off during a video session. The audio may be turned off at the sender's end or the receivers end by disabling the microphone or speaker, respectively. In one embodiment, once the audio is turned off it remains off for the duration of the video session. Once the audio is turned off, the audio is no longer transmitted between the devices to conserve bandwidth. One or more of the users may be presented with a message to this effect before being allowed to turn off the audio. The audio may be turned on again for the next audio session utilizing the audio setting interface. In other embodiments, the audio or video portion of the session may be activated or deactivated at any time. In a worst-case scenario, the application may automatically drop audio to preserve video or vice versa based on a predefined setting or user preference.

Similarly, the transmission may be packetized, streamed, and communicated utilizing any number of formats, standards, and encoding, such as MPEG 4 or HTTP. In one embodiment, the video may be encoded and compressed/decompressed utilizing the SPEEX format. SPEEX is an audio compression format designed for speech that may be used on VoIP applications and podcasts. The video may be communicated utilizing any number of computing or communications standards, protocols, and/or formats.

In another embodiment, the packets or communications may be sent and received utilizing RTP or RTSP or utilizing XTTP streaming protocol for better synchronization. In another embodiment, synchronization may occur based on a clock signal and/or other information/data included in the packet header or message.

Figure 24B:
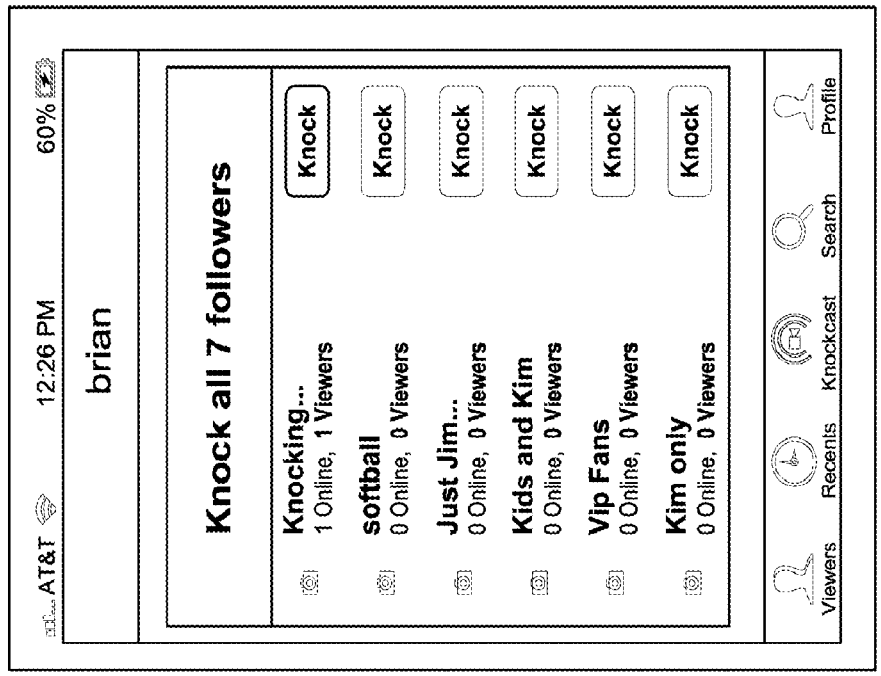
FIG. 24b is a pictorial representation of an interface for initiating a Knockcast™ in accordance with an illustrative embodiment.
Figure 24A:
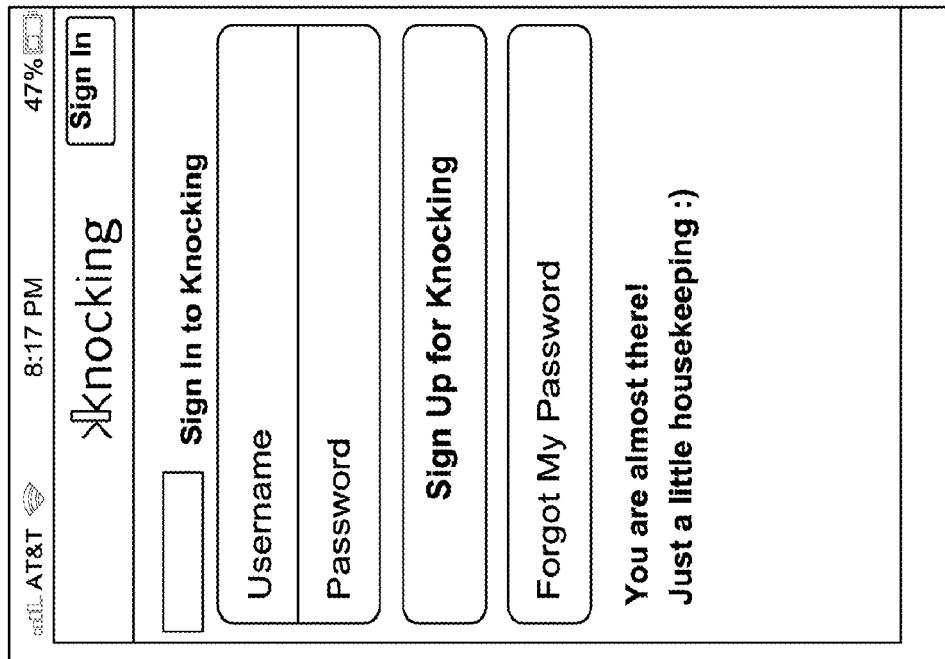
FIG. 24a is a pictorial representation of an interface for logging into the KL server in accordance with an illustrative embodiment.

FIG. 24*a* is a pictorial representation of one embodiment of an interface for logging into the KL server. In one embodiment, the user enters a user name and password in response to a request from the client to enter the information. As will be understood by those skilled in the art, a user name is not limited to that created by the user, but could also be associated with information specific to a device, such as an electronic serial number, IP address or some other manually created or automatically generated identifying information. Similarly, the password need not be limited to text, but could also be some form of bio metric identification, such as, for example, fingerprint identification, retinal identification or voice recognition system.

FIG. 24*b* is a pictorial representation of an interface for initiating a Knockcast™ or transmission from a user to multiple viewers. As depicted, the initiator can select a single recipient or multiple recipients or recipient groups.

Figures 24C, 24D:
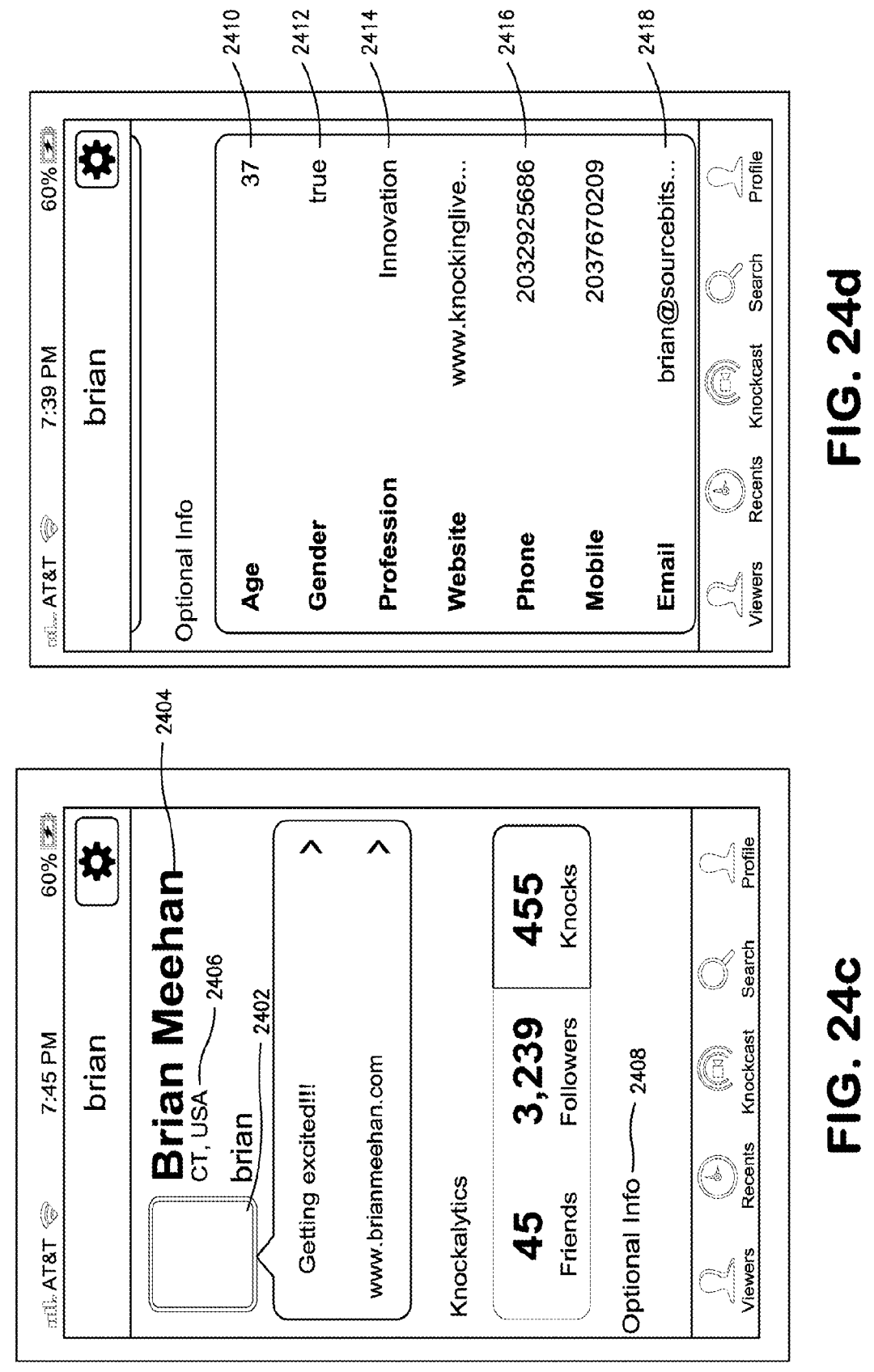

FIG. 24c is a pictorial representation of a Knocking user's profile on the user's device. As depicted, the user can include a photo 2402, name 2404, location 2406, and any other optional information 2408 in the profile. It will be understood that the user's profile contains information that is input by the user at the time the user registers with the KL server. Profile information may also be edited and revised at any time by the user once they are logged into the system.

FIG. 24d is a pictorial representation of a Knocking user's profile as it might be depicted on the user's device showing additional profile information. In one embodiment, the user can include their age 2410, gender 2412, profession 2414, phone number 2416, email address 2418, etc.

It is to be understood that the pictorials depicted in FIG. 24 are merely examples of one embodiment and in no way limit the scope of the invention.

The invention claimed is:

1. A computer-implemented method comprising:
   receiving, over a network by a computer system from a first mobile communication device, the computer system including one or more processors and a memory, a selection of a contact associated with a second mobile communication device;
   reading, by the computer system, a profile associated with the selected contact;
   determining, by the computer system from the profile, contact information associated with the second mobile communication device;
   sending, by the computer system over the network to the first mobile communication device, the contact information associated with the second mobile communication device;
   receiving, over the network by the computer system from the first mobile communication device, a share request, the share request corresponding to the second mobile communication device;
   determining, by the computer system, that the first mobile communication device and the second mobile communication device are enabled to receive push notifications;
   sending, by the computer system over the network using the contact information, the share request to the second mobile communication device via a push notification;
   receiving, by the computer system, within a first time interval, a response to the share request from the second mobile communication device;
   determining, by the computer system, that the share request was accepted by the second mobile communication device based on the response;
   initiating, by the computer system, streaming of content over the network from the first mobile communication device to the second mobile communication device wherein the content includes image content and audio content communicated in parallel through separate packets,
   determining, by the computer system, whether audio is enabled at the second mobile communication device;
   upon the condition that it is determined audio is enabled at the second mobile communication device, including, by the computer system, audio in the content streamed from the first mobile communication device to the second mobile communication device; and
   upon the condition that it is determined audio is not enabled at the second mobile communication device, excluding, by the computer system, audio in the content streamed from the first mobile communication device to the second mobile communication device.

2. The method of claim 1, wherein the streaming of content comprises streaming video content.

3. The method of claim 1, wherein the streaming of content comprises streaming audio and video content.

4. The method of claim 1, wherein the network is a wireless communications network.

5. The method of claim 1, wherein the content is recorded by the first mobile communication device and wherein the content is enabled to include image content and audio content.

6. The method of claim 1, wherein the image content is packetized in TCP packets, and wherein the audio content is packetized in UDP packets.

7. The method of claim 1, wherein the first mobile communication device is a device utilizing an APPLE®, ANDROID® or BLACKBERRY® operating system.

8. The method of claim 1, wherein the second mobile communication device is selected from the group including IPHONE®, ANDROID®, BLACKBERRY®, MOTOROLA®, HTC®, MICROSOFT®, LG®, NOKIA®, PALM®, SYMBIAN®, SONY-ERICSON® AND SAMSUNG®.

9. The method of claim 1, wherein the content contains information related to one of the following topics:
   financial news, business news, political news, political campaigns, emergency situations, advertising, religion, sports teams, celebrity news, entertainment news, personal profiles, family gatherings, or celebrity profiles.

10. A computer-implemented method comprising:
   receiving, over a network by a computer system from a first mobile communication device, the computer system including one or more processors and a memory, a selection of a contact associated with a second mobile communication device;
   reading, by the computer system, a profile associated with the selected contact;
   determining, by the computer system from the profile, contact information associated with the second mobile communication device;
   sending, by the computer system over the network to the first mobile communication device, the contact information associated with the second mobile communication device;
   receiving, over the network by the computer system from the first mobile communication device, a share request, the share request corresponding to second mobile communication device;
   determining, by the computer system, that the first mobile communication device and the second mobile communication device are enabled to receive push notifications;
   sending, by the computer system over the network using the contact information, the share request to the second mobile communication device via a push notification;
   determining, by the computer system, that a response to the share request from the second mobile communication device was not received within a first time interval;
   determining, by the computer system, based on the determination that a response to the share request from the second communication device was not received within a first time interval, that the share request timed out;
   responsive to determining the share request timed out, resending, over the network by the computer system, the share request to the second mobile communication device using the contact information;

determining, by the computer system, that a response to the share request from the second mobile communication device was received within a second time interval after the first time interval;

determining, by the computer system, that the share request was accepted by the second mobile communication device based on the response;

initiating, by the computer system, streaming of content over the network from the first mobile communication device to the second mobile communication device wherein the content includes image content and audio content communicated in parallel through separate packets, determining, by the computer system, whether audio is enabled at the second mobile communication device;

upon the condition that it is determined audio is enabled at the second mobile communication device, including, by the computer system, audio in the content streamed from the first mobile communication device to the second mobile communication device; and upon the condition that it is determined audio is not enabled at the second mobile communication device, excluding, by the computer system, audio in the content streamed from the first mobile communication device to the second mobile communication device.

* * * * *